US008092300B2

(12) United States Patent
Shibamiya et al.

(10) Patent No.: US 8,092,300 B2
(45) Date of Patent: Jan. 10, 2012

(54) GAME SERVER DEVICE, GAME MANAGEMENT SYSTEM AND RATING MANAGEMENT METHOD

(75) Inventors: Masakazu Shibamiya, Kobe (JP); Kenichi Yamamoto, Kobe (JP); Kazuma Konishi, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 99 days.

(21) Appl. No.: 12/450,540

(22) PCT Filed: Mar. 24, 2008

(86) PCT No.: PCT/JP2008/055374
§ 371 (c)(1),
(2), (4) Date: Feb. 12, 2010

(87) PCT Pub. No.: WO2008/120592
PCT Pub. Date: Oct. 9, 2008

(65) Prior Publication Data
US 2010/0151933 A1   Jun. 17, 2010

(30) Foreign Application Priority Data
Mar. 30, 2007   (JP) .................. 2007-094636

(51) Int. Cl.
*G06F 17/00* (2006.01)
(52) U.S. Cl. .................................................. 463/23
(58) Field of Classification Search ............. 463/16–25, 463/29, 40–42
See application file for complete search history.

(56) References Cited

U.S. PATENT DOCUMENTS

| 6,475,089 | B1 | 11/2002 | Lee |
| 7,390,255 | B2* | 6/2008 | Walker et al. .................. 463/42 |
| 7,787,972 | B2* | 8/2010 | Schlottmann et al. .......... 700/91 |
| 2003/0104868 | A1 | 6/2003 | Okita et al. |
| 2004/0193776 | A1 | 9/2004 | Iida et al. |
| 2007/0117621 | A1* | 5/2007 | Walker et al. .................. 463/29 |
| 2007/0117641 | A1* | 5/2007 | Walker et al. ................. 473/131 |

FOREIGN PATENT DOCUMENTS

| JP | 11-253657 | 9/1999 |
| JP | 2002-315968 | 10/2002 |
| JP | 2003-225469 | 8/2003 |
| JP | 2004-298234 | 10/2004 |
| JP | 2006-254979 | 9/2006 |
| WO | WO-99/38590 | 8/1999 |

* cited by examiner

*Primary Examiner* — Ronald Laneau
(74) *Attorney, Agent, or Firm* — Jordan and Hamburg LLP

(57) ABSTRACT

A game server device, which can communicate with a plurality of game terminal devices through which registered players can play a competitive game, is provided with a rating calculation unit for calculating ratings of players for each competition; a comparison unit for comparing a mean value of ratings of all registered players and a predetermined reference value; an adjustment unit for carrying out processing to bring the means value closer to the reference value; a CPU player setting unit for setting a CPU player to an opponent player of the registered player. When the average value is smaller than the reference value, the adjustment unit sets the CPU player as an opponent player of the registered player, and sets the rating of the CPU player to be larger than its original rating of the registered player, whereas in the reverse case, the adjustment unit sets the rating of the CPU player to be smaller than the original rating in the calculation of the rating of the registered player. The mean value of all players' ratings indicating their strength in the competitive game is brought closer to the reference value.

11 Claims, 21 Drawing Sheets

FIG.17

| RATING DIFFERENCE | WINNING PROBABILITY (%) |
|---|---|
| 0~49 | 50.0 |
| 50~99 | 52.5 |
| ⋮ | ⋮ |
| 400~449 | 70.0 |
| ⋮ | ⋮ |
| 950~1000 | 97.5 |

GAME SERVER DEVICE, GAME MANAGEMENT SYSTEM AND RATING MANAGEMENT METHOD

TECHNICAL FIELD

The present invention relates to game server devices, game management systems, and rating management methods in which a competitive game is carried out via communication means between a plurality of game terminal devices that are communicably connected to a game server device.

BACKGROUND ART

Conventionally, in competitive type games, various methods have been employed as methods of gauging the skill level or capabilities, that is, the strength, of a player in that competitive game. For example, these include a percentage of wins or a total value of a required parameter or the like. In a mahjong game, there are yellow dragon levels and the like depending on the percentage of wins and the number of orbs held that have been passed on from a loser to a winner, but considering the percentage of wins for example, in addition to a percentage of wins for which first place has been acquired, it is conceivable that giving consideration to a percentage of fourth place would also be necessary, and therefore there is doubt as to whether a truly strong player is determined by the only the percentage of wins. In this manner, neither of these is sufficient as an indicator for gauging strength.

On the other hand, in competitive type games, methods are known of managing the real capabilities of each player using indicators known as ratings. These indicators accurately show what degree of difference there is in real capabilities by comparing numerical values of each player, and have long been employed by international chess associations and the like.

Patent Document 1 describes employing rating values in determining rankings among teams in a team format competitive contest, and Patent Document 2 describes a calculation method of rating values as an indicator that indicates skill levels in a game.

Incidentally, in rating systems, since values are increased and decreased in accordance with rules to winners and losers after a competition, it is conceivable that a mean value of rating values held by all the players would be a predetermined value, but it is evident that the mean value of ratings decreases over a long continued period of use of the rating system. For example, in the mid 1970s, it became clear that the mean rating in the United States Chess Federation (USCF) was becoming lower, and various measures were devised to deal with this including using bonus points. The reason for this is unclear, but it is thought to involve that the ratings of new members are below the mean point and the ratings of resigning members are above the mean. Furthermore, it cannot be said that the opposite phenomenon of a rising mean value of ratings does not occur.

When the mean value of ratings fluctuates in this manner, it becomes difficult to grasp one's own strength among all the players as a result of the mean value fluctuating even when there is no change in one's own rating, and there is a risk that the reliability of ratings as an indicator is impaired. Neither Patent Document 1 or 2 describes a method for addressing this issue.

Patent Document 1: Japanese Patent Application Laid-open No. 2004-298234
Patent Document 2: Japanese Patent Application Laid-open No. 2006-254979

DISCLOSURE OF INVENTION

The present invention provides a game server device, a game management system, and a rating management method that address the above-described problem.

According to one aspect of the present invention, a game server device that is communicably connected to a plurality of game terminal devices, which are communicably connected to each other and through which a competitive game can be executed with each other by receiving operations of players registered as members, is provided with: rating calculation means for calculating a rating to be set for each of registered players by taking both a win-loss result for each competition and a difference of ratings between players who have competed as a probability of winning, and adding an increase/decrease value in accordance with the probability of winning to the rating; rating storage means for storing calculated ratings for each registered player; CPU player setting means for setting, as an opponent against registered players, a CPU player, for which a predetermined rating is set, and which is controlled by a computer; and adjustment means for setting a rating of the CPU player, taking into account a capability of a registered players who are to compete.

According to another aspect of the present invention, a game management system provided with a plurality of game terminal devices which are communicably connected to each other, and through which a competitive game can be executed with each other by receiving operations of players registered as members, and a game server device that is communicably connected to the game terminal devices, the game management system is provided with: rating calculation means for calculating a rating to be set for registered players by taking both a win-loss result or each competition and a difference of ratings between players who have competed as a probability of winning and adding an increase/decrease value in accordance with the probability of winning to the rating; rating storage means for storing calculated ratings for each registered player; CPU player setting means for setting a CPU player for which a predetermined rating is set, and which is controlled by a computer, as an opponent against registered players; and adjustment means for setting a rating of the CPU player, taking into account a capability of registered players) who are to compete.

According to yet another aspect of the present invention, in a rating management method for managing ratings relating to playing capabilities of players registered as members who carry out a competitive game with each other via communication means among multiple game terminal devices communicably connected with a game server device, the rating management method is provided with: a rating calculation step of calculating a rating to be set for registered players by taking both a win-loss result for each competition and a difference of ratings between players who have competed as a probability of winning, and adding an increase/decrease value in accordance with the probability of winning to the rating; a storage step of storing calculated ratings for each registered player, a CPU player setting step of setting a CPU player for which a predetermined rating is set, and which is controlled by a computer, as an opponent against registered players, and an adjustment step of setting a rating of the CPU player, taking into account a capability of registered players who are to compete.

BRIEF DESCRIPTION OF THE DRAWINGS

FIG. 17 is a table showing one example of a relationship between rating differences and winning probabilities.

BEST MODE FOR CARRYING OUT THE INVENTION

Figure 1:
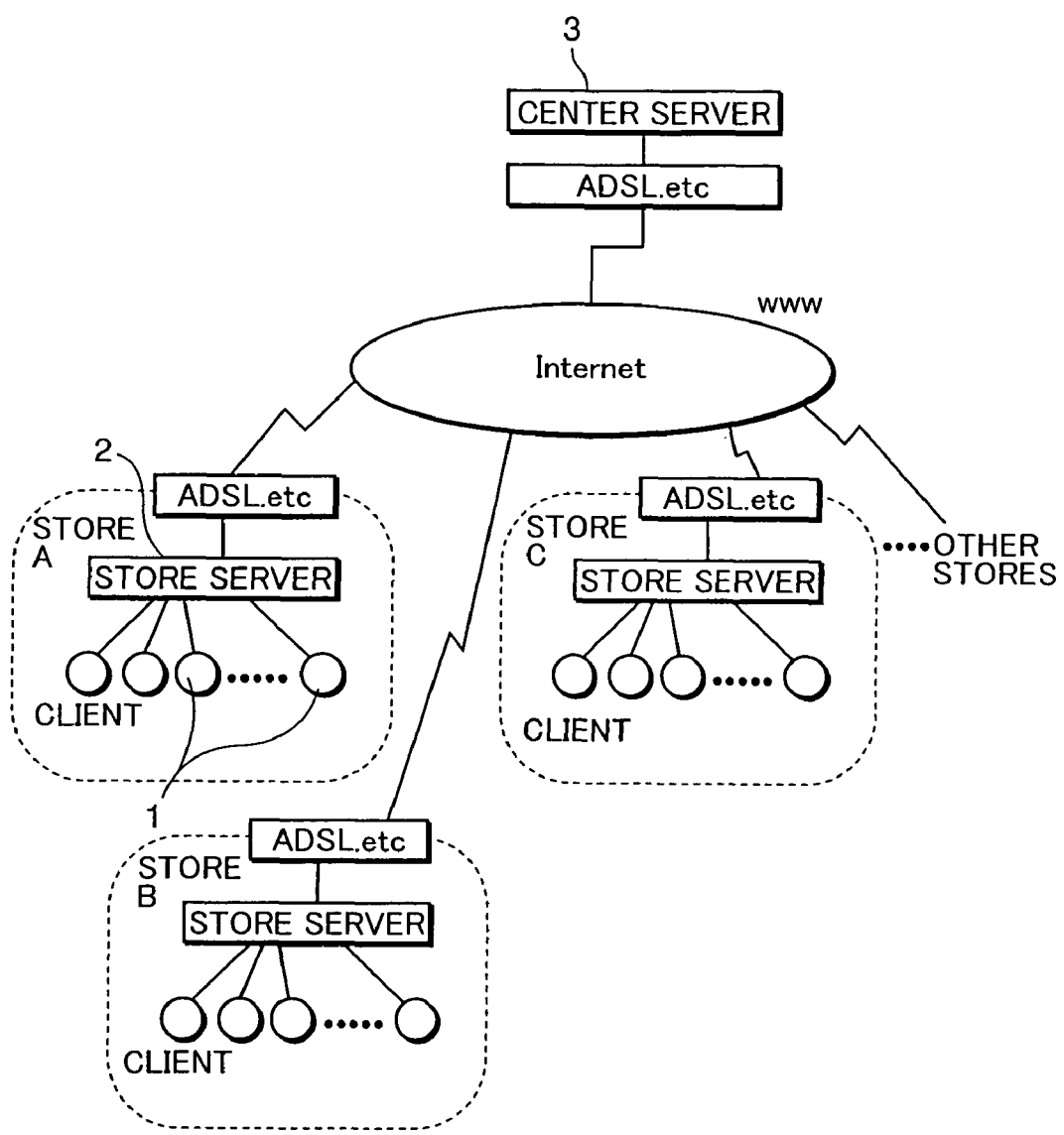
FIG. 1 is a configuration view of a game system in which game terminal devices and game server devices are applied according to one embodiment of the present invention.

FIG. 1 is a configuration view of a game system in which game terminal devices and game server devices are applied according to one embodiment of the present invention. A game system is provided with client terminal devices (game terminal devices) 1, each associated with identification information, store server devices 2 that are communicably connected to the multiple (here, eight) client terminal devices 1, and a center server device 3 that is communicably connected to the multiple store server devices 2 and manages a game, which is carried out by multiple players using the client terminal devices 1.

The client terminal devices 1 enable the game to advance by having players carry out predetermined operations based on game screens displayed on monitors. It should be noted that the identification information associated with the client terminal devices 1 includes identification information for each store server device 2 to which the client terminal device 1 is connected (or identification information of the store in which the client terminal device 1 is installed), and identification information (referred to as terminal number) for each client terminal device 1 inside a store in which client terminal devices 1 are installed. For example, "A" is identification information of a store A, and in a case where the identification information of a client terminal device 1 inside the store A is "4," the identification information of this client terminal device 1 is "A4."

The store server devices 2 are communicably connected to their respective multiple client terminal devices 1 and the center server device 3, and carry out transmission and reception of data between the client terminal devices 1 and the center server device 3. Furthermore, the store server devices 2 are configured to enable the advancement of a game, for example a competitive game, between multiple client terminal devices 1 by enabling the transmission and reception of operational data in response to operational content of each player between a single client terminal device 1 and another single or required number of client terminal devices 1.

The center server device 3, which is communicably connected to the multiple store server devices 2, stores player information in which a user ID is associated for specifying an individual player, and selects a player and another player (referred to as an opponent) to carry out a game in a same game space by carrying out transmission and reception of data with the client terminal devices 1 via the store server devices 2.

Figure 2:
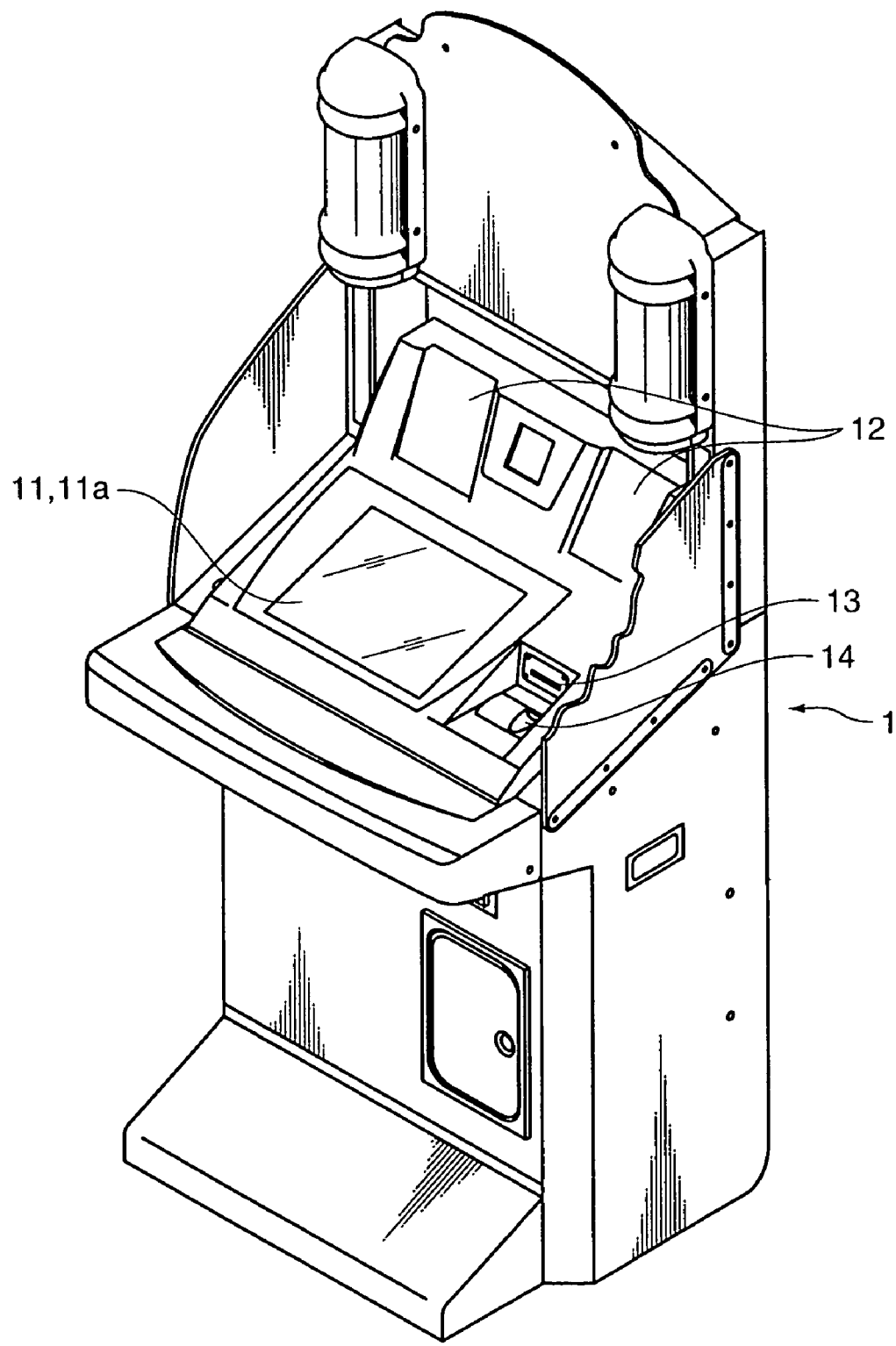
FIG. 2 is a perspective view showing an external appearance of one embodiment of a client terminal device.

FIG. 2 is a perspective view showing an external appearance of one embodiment of a client terminal device 1. It should be noted that a game carried out using the client terminal device 1 may be an individual game (a one-on-one competition against a CPU player) or may be a competitive game against multiple players. In the present embodiment, a mahjong is assumed in which a player operating the client terminal device 1 competes against at least one of a player operating another client terminal device 1 and a CPU player. In the case of competing against a player operating another client terminal device 1, transmission and reception of operational data is carried out in response to the content operated by each player between the client terminal devices 1 during competition via a network communication unit 18, which is described later, and a store server device 2.

The client terminal device 1 is provided with a monitor 11 on which a game screen is displayed, a touch panel 11a that determines which button has been indicated from an address of a button prompting a selection of the like displayed on the game screen of the monitor 11 and a position pressed by the player, speakers 12 that output audio, a card reader 13 that reads in information such as a user ID stored on an individual card, and a coin receiving unit 14 that receives coin(s) inserted by the player. The monitor 11 displays images and may be a liquid crystal display or a plasma display or the like.

Furthermore, the individual card is a magnetic card or an IC card or the like on which individual information including a user ID of the like is stored, and functions as a member card. In the present embodiment, the individual card is obtained at an individual card vending machine 25 of the store server device 2, and input of individual information obtained when playing the client terminal device 1 for the first time is received to carry out member registration. Alternatively, in an embodiment where an information input unit is provided in the store server device 2, member registration may be performed via the store server device 2. Furthermore, an embodiment may be used in which member registration is performed by having the player take the individual card, which has been obtained from the individual card vending machine 25, to a reception management office or the like inside in the store, and receiving electrical or magnetic input there of the necessary information.

A control unit 16 (see FIG. 3), which is configured by a microcomputer or the like that receives detection signals from each unit and outputs control signals to each unit, is installed in an appropriate location in the client terminal device 1.

Figure 3:
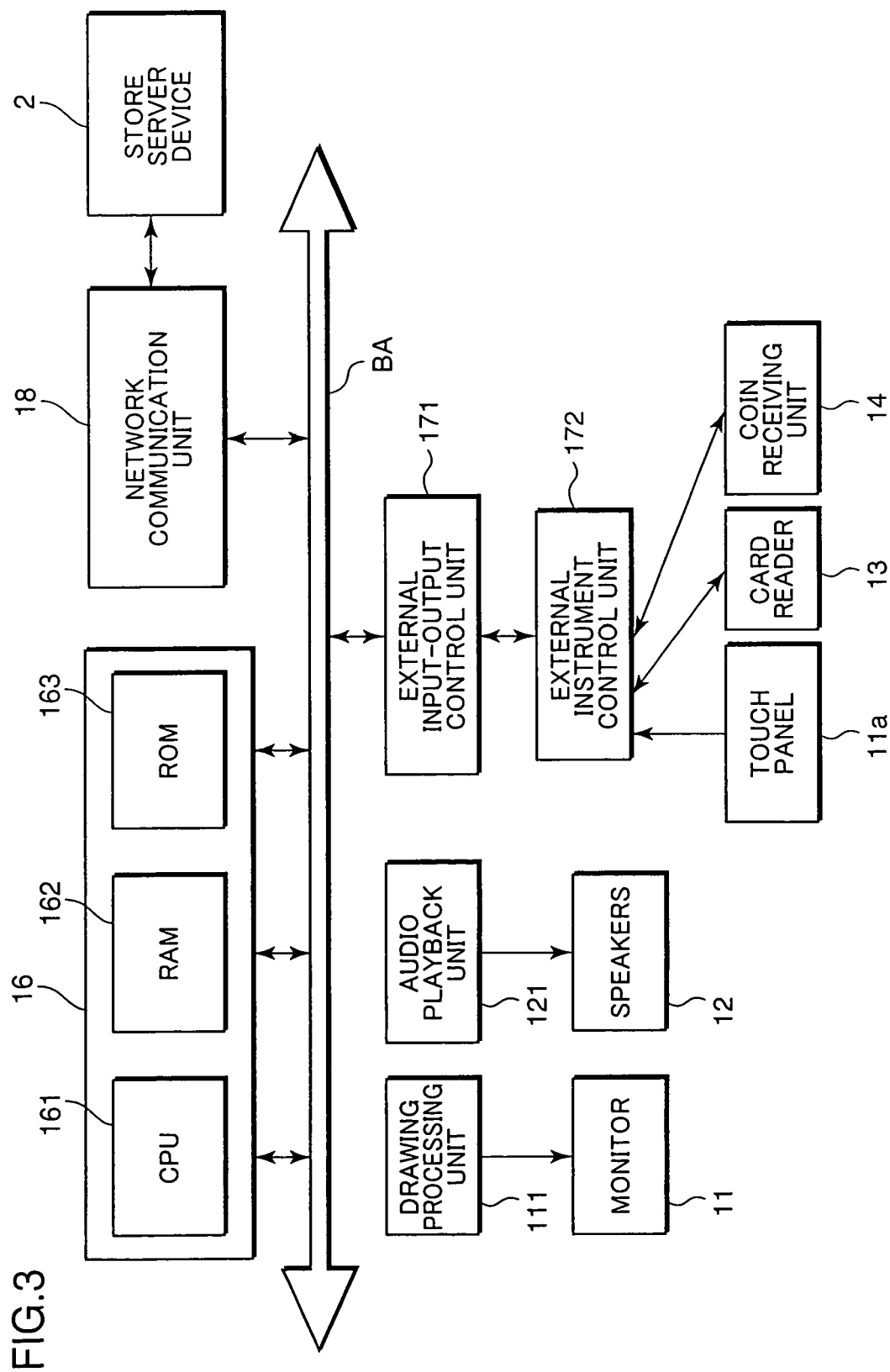
FIG. 3 is a hardware configuration view showing one embodiment of the client terminal device.

FIG. 3 is a hardware configuration view showing one embodiment of the client terminal device 1. The control unit 16 controls overall operations of the client terminal device 1 and is provided with an information processing unit (CPU) 161 that carries out various types of information processing such as processing relating to general game advancement and image display processing, a RAM 162 that temporarily stores information and the like during processing, and a ROM 163 on which is stored in advance predetermined image information, a game program, a rating calculation program, and the like, which are described later.

An external input-output control unit 171 converts detection signals to digital signals for processing between the control unit 16 and detection units including the card reader 13, the touch panel 11a, and the coin receiving unit 14, and also converts instruction information to control information for output to various instruments of the detection units, and the signal processing and input-output processing involved here is carried out in a time division manner for example. An external instrument control unit 172 carries out output operations of control signals to the various instruments of the detection units and input operations of detection signals from the various instruments of the detection units within time division periods respectively.

A drawing processing unit 111 displays required images on the monitor 11 in accordance with image display instructions from the control unit 16, and is provided with a video RAM and the like. An audio playback unit 121 outputs predetermined messages and background music (BGM) and the like to the speakers 12 in accordance with instructions from the control unit 16.

Mahjong tile characters, background images, images of various screens, and the like are stored on the ROM 163. The mahjong tile characters and the like are configured by a required number of polygons so as to enable 3D drawing thereof and, based on drawing instructions from the CPU 161, the drawing processing unit 111 carries out calculations to convert positions in a 3D space to positions in a pseudo 3D space, and light source calculation processing and the like, then carries out writing processing based on results of the above-mentioned calculations for image data to be drawn to the video RAM, for example a writing (pasting) process of texture data to an area of the video RAM specified as a polygon.

Here, description is given of a relationship between operations of the CPU 161 and operations of the drawing processing unit 111. Based on an image display processing unit, which carries out output of image information from inside or outside to the monitor 11 and the display thereof, and an operating system (OS) recorded on the detachable ROM 163, the CPU 161 reads out images, audio, control program data, and game program data from the ROM 163. A portion or all of the images, audio, control program data, and the like that have been read out are held in the RAM 162. Thereafter the CPU 161 proceeds with processing based on the control programs, various types of data (image data including text images and other images such as polygons of display objects and textures, and audio data), which are being stored in the RAM 162, as well as detection signals and the like from the detection units.

Among various data stored on the ROM 163, data that can be stored on detachable recording media may be readable by a driver of a hard disk drive, an optical disk drive, a flexible disk drive, a silicon disk drive, or a cassette media reading device or the like for example, and in this case the recording media includes hard disks, optical disks, flexible disks, CDs, DVDs, and semiconductor memories or the like for example.

The network communication unit 18 is for performing transmission and reception of operational information of the player and event information and the like that occur during execution of a mahjong game via a network and the store server device 2 or the like with regard to the client terminal devices 1 during competition. Furthermore, the network communication unit 18 is for performing transmission and reception of receiving new players before and after game execution, exchange of individual information between players (client terminal devices 1) when deciding competitors, and game results at the time of completion of a game between the client terminal devices 1 and the center server device 3 via a network and the store server devices 2 and the like.

Figure 4:
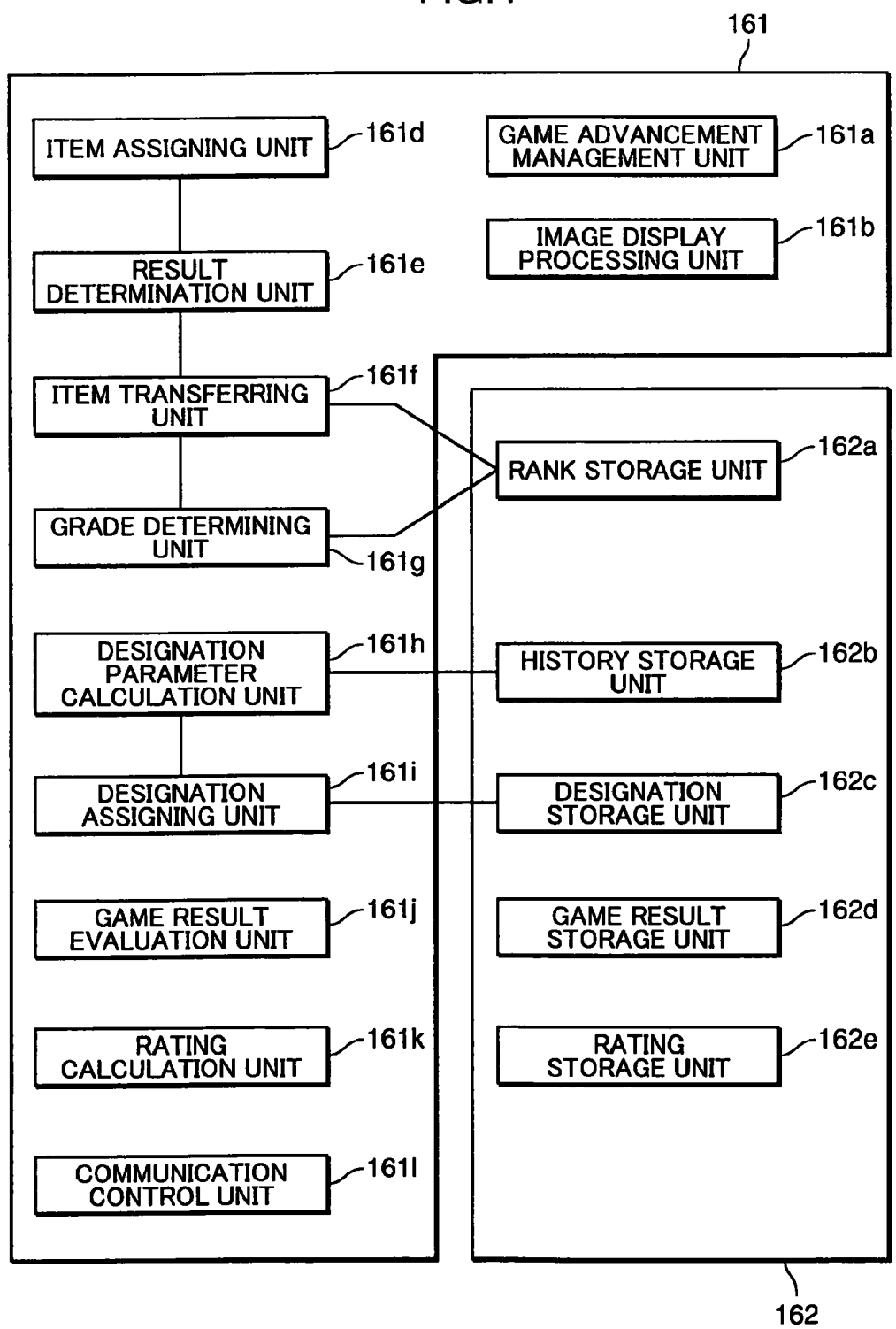
FIG. 4 is a function configuration view of a control unit of the client terminal device.

FIG. 4 is a function configuration view of the control unit 16 of the client terminal device 1. The CPU 161 of the control unit 16 is provided with a game advancement management unit 161a that manages a series of processes to control advancement of a game accompanying commencement of the game, advancement during the game and until completion of the game, and information communication, an image display processing unit 161b that displays required images on the monitor 3, an item assigning unit 161d that virtually assigns items of a predetermined numerical amount to the player, a result determination unit 161e that determines the player's ranking in the game at the completion of each game, an item transferring unit 161f that transfers between players a predetermined numerical amount of items virtually held by the players based on a determination result by the result determination unit 161e, a grade determining unit 161g that determines a grade (corresponding to a class) that indicates a level of strength of that player in the game based on the quantity of items virtually held by the player, a designation parameter calculation unit 161h that calculates a designation parameter indicating a feature of the player in the game based on history data stored in a history storage unit 162b to be described later, a designation assigning unit 161i that assigns a player designation to players in the game based on the calculated designation parameters, a game result evaluation unit 161j that obtains game results at the time of completion of the game by evaluating operations of the player during the game, a rating calculation unit 161k that calculates ratings, which are described later, of each player who competed at the time of completion of the competition, and a communication control unit 161l that controls exchanges of required information between the client terminal devices 1 and the store server device 2. It should be noted that the rating calculation unit 161k may be provided in the center server device 3 instead of being provided in the client terminal device 1.

Furthermore, the RAM 162 of the control unit 16 is provided with a grade storage unit 162a that stores item quantities and grade information associated with player designations, a history storage unit 162b that stores for each player the past game history data of the player, a designation storage unit 162c that stores designations assigned by the designation assigning unit 161h associated with the designation of the player, a game result storage unit 162d that stores a value of a number of chips held by the player evaluated by the game result evaluation unit 161*j*, and a rating storage unit 162*e* that stores ratings.

The item assigning unit 161*d* virtually assigns items (here, items called dragon chips) to players who meet a predetermined condition, and increase/decrease points virtually possessed by the players, and store item numbers and points associated with the designation of player in the grade storage unit 162*a*.

The result determination unit 161*e* determines a ranking in order of highest points virtually held as chips by the players when a predetermined number of games has been completed at a table selected by a selection unit 361*b*, which is described later. However, at the commencement of a game, the numbers of points (referred to as starting points) virtually held as chips by the players are equivalent. For example, the starting points may be 20,000 points.

The item transferring unit 161*f* is a unit that, after the ranking has been determined by the result determination unit 161*e*, transfers among the players a predetermined quantity of items virtually held by the players based on the determination result of the result determination unit 161*e* and the number of games played.

The grade determining unit 161*g* determines a grade indicating a level of strength in the game of a player based on the number of items virtually held by that player, and stores this in the grade storage unit 162*a* associated with the designation of the player, and transmits grade information to the center server device 3 via the network communication unit 18, a network, and the store server devices 2 or the like.

When the determination of grade carried out by the grade determining unit 161*g* is determined to be an initial grade, the designation parameter calculation unit 161*h* calculates designation parameters indicating features of the player in the game based on history data stored in the history storage unit 162*b*, which is described later. The parameters, which are defined below, include a winning rate, a feeding rate, a mean lucky ('dora') tile number and a mean hand point number.

(Winning rate)=(aggregate number of wins)/(aggregate number of games played)

(Feeding rate)=(aggregate number of feeds)/(aggregate number of games played)

(Mean lucky tile number)=(aggregate number of lucky tiles at time of winning)/(aggregate number of wins)

(Mean hand point number)=(aggregate number of hand points at time of winning)/(aggregate number of wins)

It should be noted that the aggregate number of wins, aggregate number of feeds, aggregate number of games played, aggregate number of lucky tiles at time of winning, aggregate number of hand points at time of winning, and the aggregate number of wins used in the above expressions are associated with the identification information of the player and stored in the history storage unit 162*b*, which is described later.

The designation assigning unit 161*i* virtually assigns a player designation to the players in the game based on the designation parameters calculated by the designation parameter calculation unit 161*h* when the determination of grades carried out by the grade determining unit 161*g* is determined to be an initial grade, then stores this in the designation storage unit 162*c* associated with the designation of the player, and transmits designation information to the center server device 3 via the network communication unit 18, a network, and the store server devices 2 or the like.

The game result evaluation unit 161*j* obtains game results at the time of the end of a game by evaluating player operations in the game in accordance with predetermined rules. The game results indicate results in which player operations during the game are evaluated. Specifically, the game results indicate the numbers of chips held by the players, which fluctuate up and down from the time of game commencement to the time of game completion, as a game result after the completion of the game.

At the completion of each game, the rating calculation unit 161*k* newly calculates the rating that has been set after each player has performed member registration, and the details of this are described later. It should be noted that the types of games may all be competitive games, but from the perspective of maintaining accuracy in the ratings, the present embodiment is limited to competitive games of three or four people without including one-on-one competitions against the CPU player.

The grade storage unit 162*a* stores the numbers of items, which have been assigned by the item assigning unit 161*d* and updated by the item transferring unit 161*f*, and the grades that have been determined by the grade determining unit 161*g* associated with the player designations.

For each player, the history storage unit 162*b* stores as past game history data of the player, data such as the aggregate number of wins, which is an aggregate number of times the player has won, the aggregate number of feeds, which is an aggregate number of times the player has performed feeding, the aggregate number of games played, which is an aggregate number of games the player has played, the aggregate lucky ('dora') tile number, which is an aggregate number of lucky tiles held in the player's hand at the time of winning, the aggregate hand point number, which is an aggregate number of hand points held in the player's hand at the time of winning, and the aggregate number of wins, which is an aggregate number of times of winning.

The designation storage unit 162*c* stores data such as values of designation parameters calculated by the designation parameter calculation unit 161*h* and designations assigned by the designation assigning unit 161*i*.

The game result storage unit 162*d* stores values of numbers of chips held by the player evaluated (calculated) by the game result evaluation unit 161*j* associated with the name of the player.

The rating storage unit 162*e* reads out from the center server device 3 the current rating played at the relevant client terminal device 1 and temporarily stores this, then stores a newly recalculated rating in an updating manner at the time of completion of the competitive game.

Figure 5:
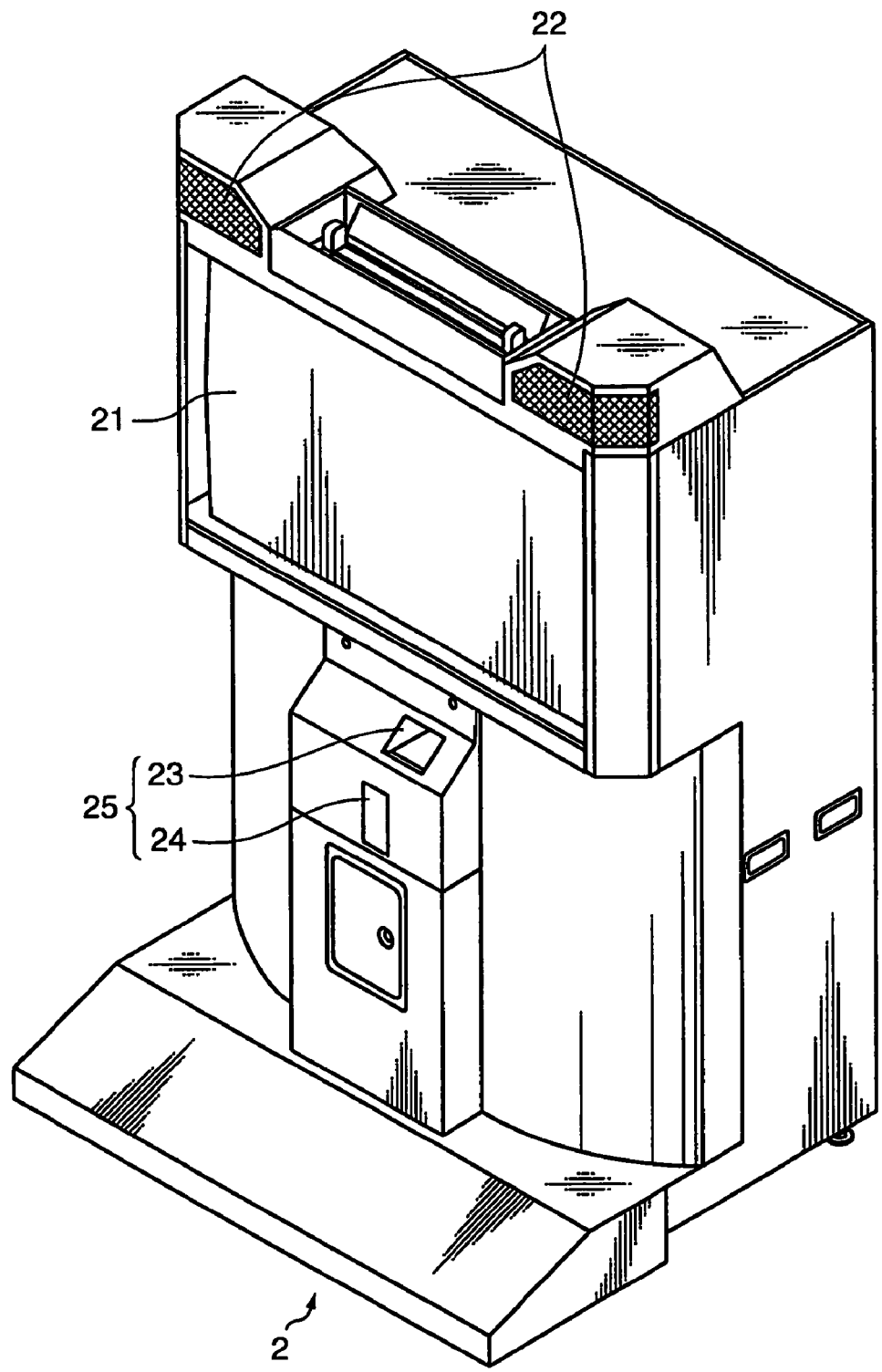
FIG. 5 is a perspective view showing an external appearance of one embodiment of a store server device.

FIG. 5 is a perspective view showing an external appearance of one embodiment of a store server device 2. The store server device 2 is provided with a monitor 21 that displays game screens and the like, speakers 22 that output audio, and an individual card vending machine 25 that receives coin(s) inserted by a player and sells individual cards.

The speakers 22 output predetermined messages and BGM. The individual card vending machine 25 is provided with a coin receiving unit 24 that receives coin(s) inserted by the player and a card disbursement unit 23 that disburses individual cards. It should be noted that the coin receiving unit 24 is provided with a coin discharge slot (omitted from drawings) for performing discharge in a case where the inserted coin(s) are faulty coins or the like.

A control unit 26 (see FIG. 6), which is configured by a microcomputer or the like that receives detection signals from each unit and outputs control signals to each unit, is installed in an appropriate location in the store server device 2.

Figure 6:
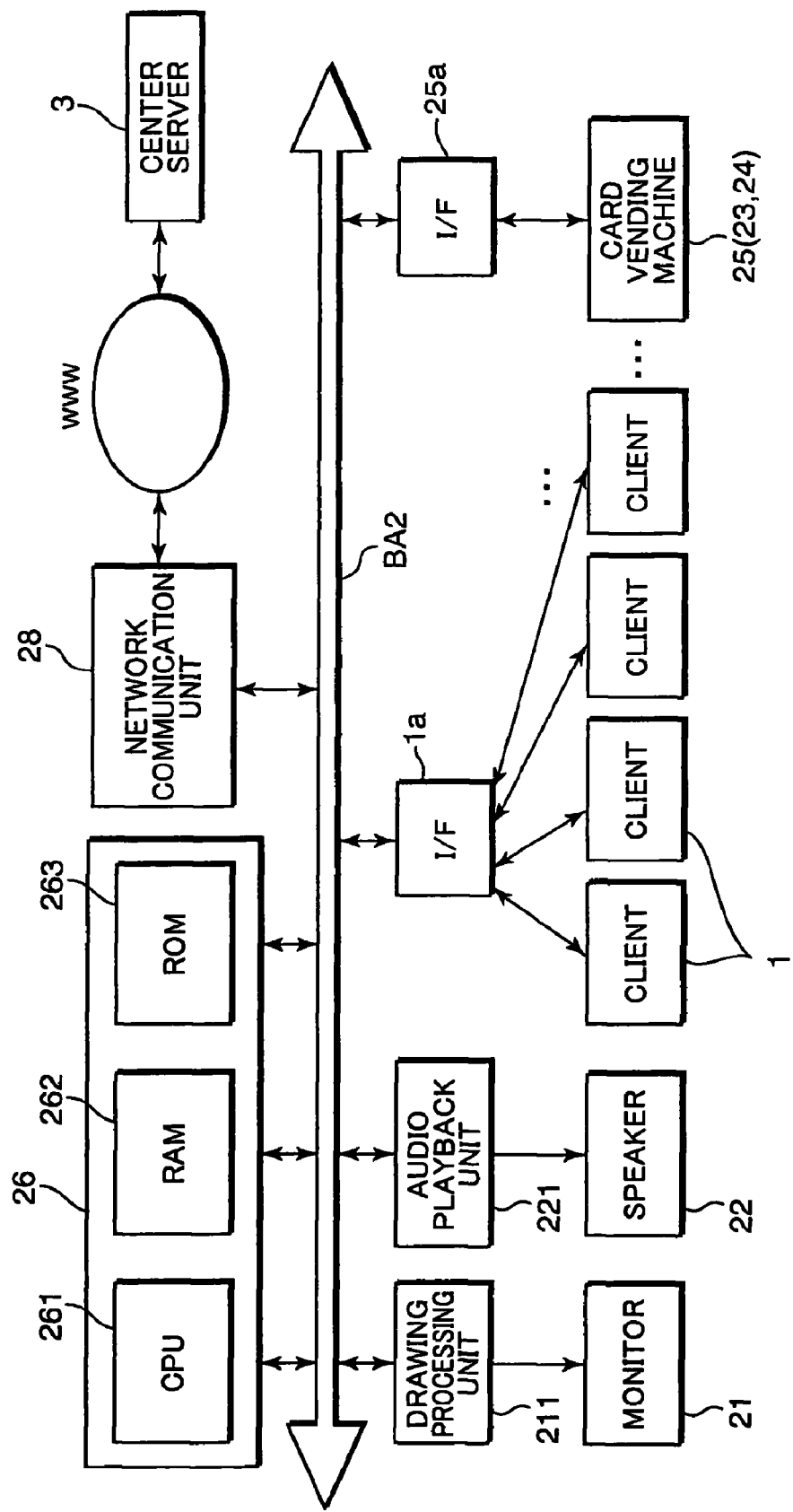
FIG. 6 is a hardware configuration view showing one embodiment of the store server device.

FIG. 6 is a hardware configuration view showing one embodiment of the store server device 2. The control unit 26 controls overall operations of the store server device 2 and is provided with an information processing unit (CPU) 261, a RAM 262 that temporarily stores information and the like during processing, and a ROM 263 on which is stored in advance predetermined image information, and the like.

A drawing processing unit 211 displays required images on the monitor 21 in accordance with image display instructions from the control unit 26, and is provided with a video RAM and the like. An audio playback unit 221 outputs predetermined messages and BGM and the like to the speakers 22 in accordance with instructions from the control unit 26.

Among various data stored on the ROM 263, data that can be stored on detachable recording media may be readable by a driver of a hard disk drive, an optical disk drive, a flexible disk drive, a silicon disk drive, or a cassette media reading device or the like for example, and in this case the recording media includes hard disks, optical disks, flexible disks, CDs, DVDs, and semiconductor memories or the like for example.

A network communication unit 28 performs transmission and reception of various data with the center server device 3 via a network constituted by the World Wide Web (WWW) or the like. An interface unit 1a is for exchanging data between the multiple (for example, eight) client terminal devices 1 connected to the store server device 2.

The control unit 26 transmits information, in which terminal identification information received from the center server device 3 via the network communication unit 28 has been assigned, via the interface unit 1a to the client terminal device 1 corresponding to that terminal identification information. Furthermore, it transmits information, in which terminal identification information received from the client terminal device 1 via the interface 1a has been assigned, to the center server device 3 via the network communication unit 28.

Figure 7:
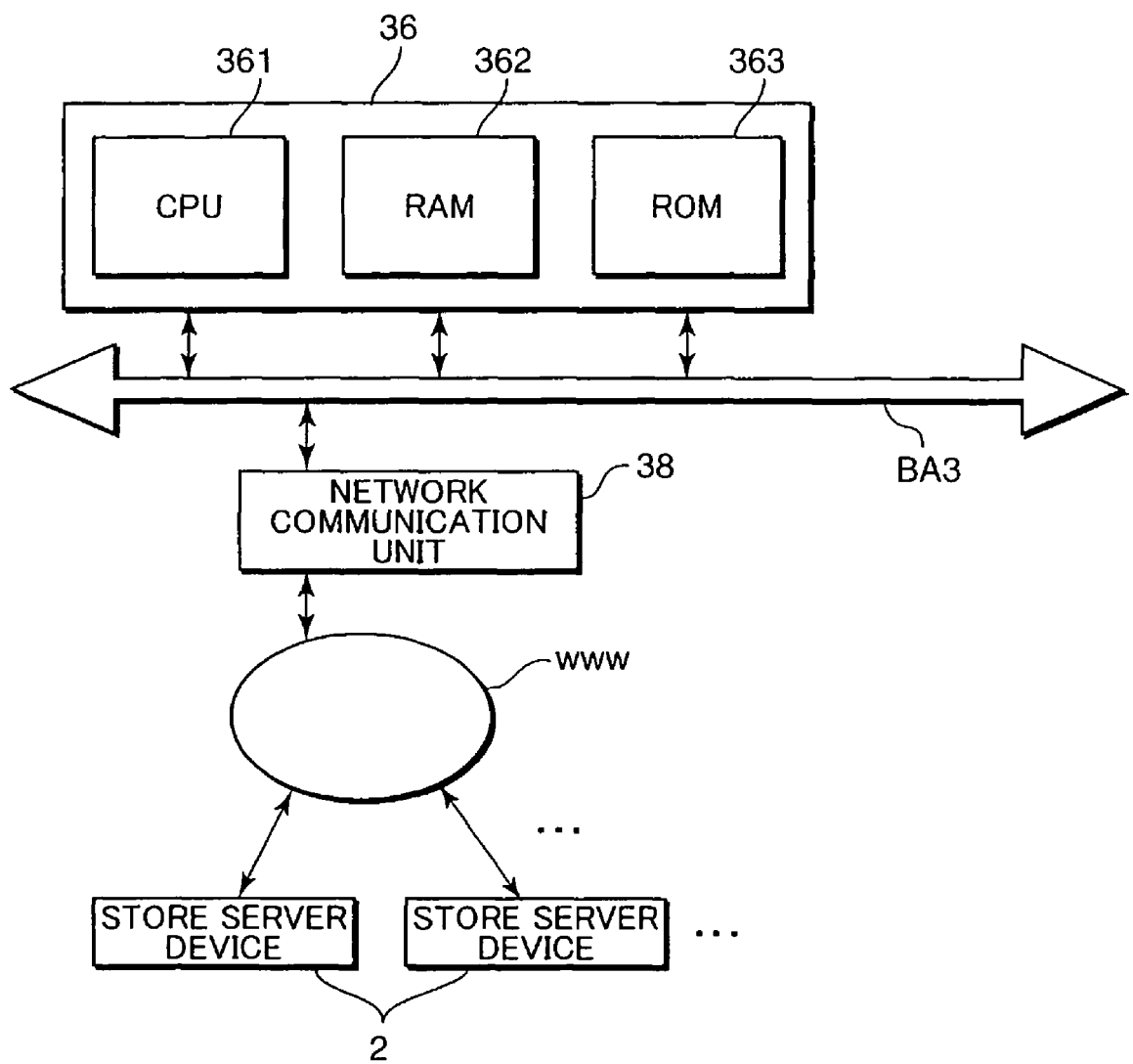
FIG. 7 is a hardware configuration view showing one embodiment of a center server device.

FIG. 7 is a hardware configuration view showing one embodiment of a center server device 3 according to the present invention. A control unit 36 controls overall operations of the center server device 3 and is provided with an information processing unit (CPU) 361, a RAM 362 that temporarily stores information and the like during processing, and a ROM 363 on which is stored in advance predetermined image information, individual information of the players, player information relating to the game for each player, and the like.

Among various data stored on the ROM 363, data that can be stored on detachable recording media may be readable by a driver of a hard disk drive, an optical disk drive, a flexible disk drive, a silicon disk drive, or a cassette media reading device or the like for example, and in this case the recording media includes hard disks, optical disks, flexible disks, CDs, DVDs, and semiconductor memories or the like for example.

A network communication unit 38 performs information transmission and reception of various data among corresponding client terminal devices 1 in accordance with terminal identification information through any of the multiple store server devices 2 via a network constituted by the WWW or the like.

It should be noted that a game management program according to the present invention and a rating adjustment program to be described later are recorded on the ROM 363 then loaded into the RAM 362, and the respective functions thereof are achieved by successively executing the game management program in the RAM 362 by the CPU 361.

Figure 8:
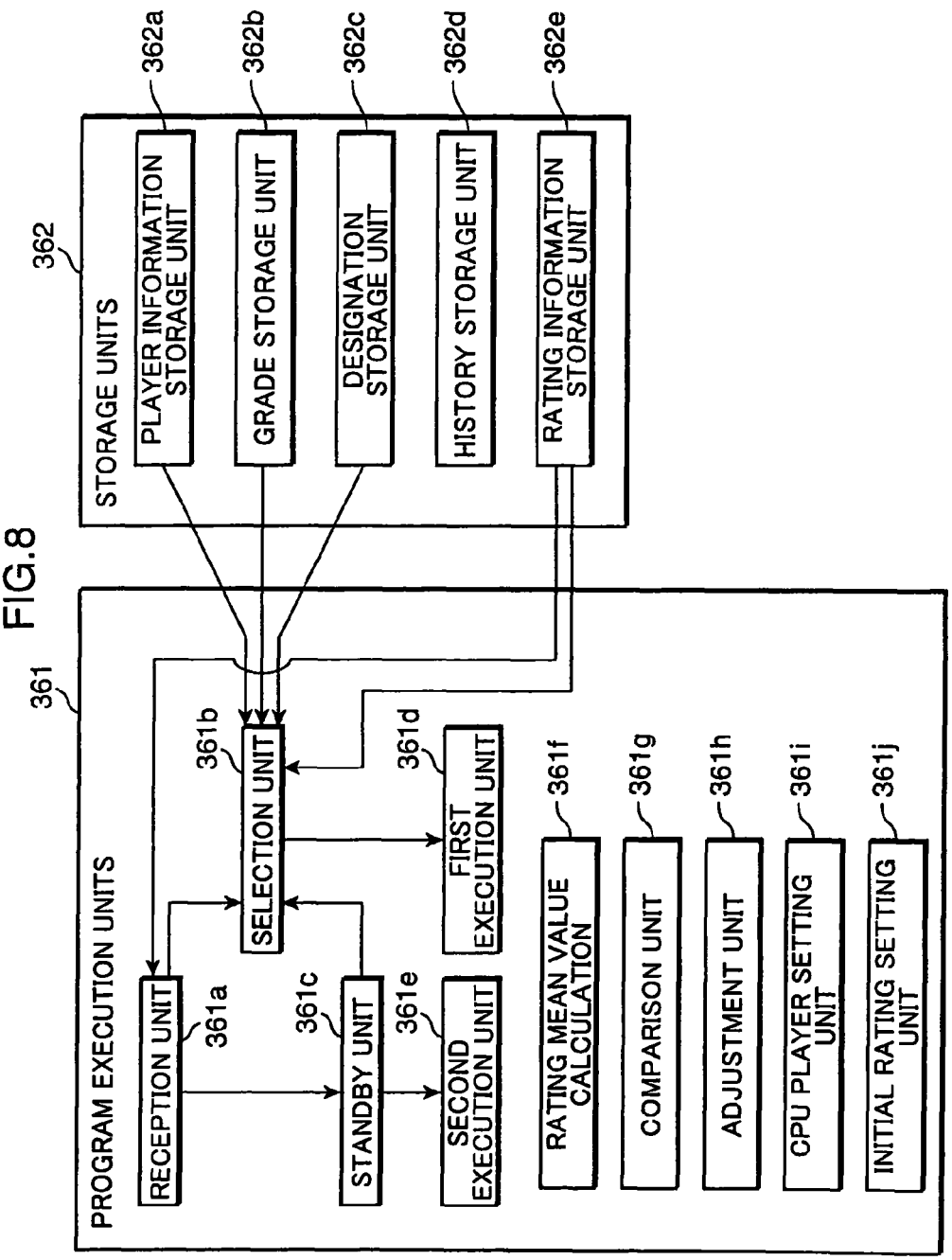
FIG. 8 is a function configuration view of a control unit of the center server device.

FIG. 8 is a function configuration view of a control unit 36 of the center server device 3. The CPU 361 of the control unit 36 is provided with a reception unit 361a that handles reception of participation players to a game at the commencement of a game at each of the client terminal devices 1, a selection unit 361b that selects players received by the reception unit 361a and players of a predetermined maximum number (here, three) or less and a predetermined number (here, two) or more that are to play in a same game space from among players who have been put into a standby state by a standby unit 361c to be described later in accordance with predetermined rules, a standby unit 361c that puts players who are in a state of not being selected by the selection unit 361b into a standby state, and causes the selection unit 361b to execute selection on these players, a first execution unit 361d that causes execution of the game in the same game space among players selected by the selection unit 361b, a second execution unit 361e that causes execution of the game in a same game space among player(s) that have been put in a standby state by the standby unit 361c and a CPU player(s), a rating mean value calculation unit 361f that calculates a mean of the ratings of all members, a comparison unit 361g that calculates a difference between the calculated rating mean value and a predetermined reference value, an adjustment unit 361h that, in a case where the difference between the calculated rating mean value and the predetermined reference value is a predetermined value, determines whether or not to execute an adjustment process for bringing the rating mean value closer to the reference value and, based on this determination, performs a settings change in accordance with conditions to be described later on the rating of the CPU player at the completion of a competitive game into which a CPU player had been inserted, a CPU player setting unit 361i that, when insertion of a CPU player has been determined by the adjustment unit 361h, causes insertion of the CPU player, whose game advancement is controlled by the control unit 36 (controlled by computer), into the competitive game, and an initial rating setting unit 361j for performing initial settings of ratings to new members under predetermined conditions as mentioned earlier (for example, number of games completed).

The RAM 362 is provided with a player information storage unit 362a that stores individual information such as user ID data, a grade storage unit 362b that stores class information indicating a level of strength of a player in the game associated with player identification information (user ID data), a designation storage unit 362c that stores designation information indicating a tactical feature of a player in the game associated with player identification information, a history storage unit 362d stores information such as the aggregate number of wins, aggregate number of feeds, aggregate number of games played, aggregate number of lucky tiles at time of winning, aggregate number of hand points at time of winning, and the aggregate number of wins, which is information of past competition results of the player in the game, associated with the player identification information, and a rating information storage unit 362e that stores information necessary for rating adjustments.

The reception unit 361a receives individual information such as user ID data or the like of the players transmitted from each client terminal device 1, and handles participation of players into the game based on the player information stored in the player information storage unit 362a.

The selection unit 361b selects (combines) players received by the reception unit 361a and two or more or three or less players to play in the same game space from among players that have been put into a standby state by the standby unit 361c in accordance with processing rules, which are here based on the classes stored in the grade storage unit 362b and designations stored in the designation storage unit 363c. Further still, in a case where the number of selected players is less than three (namely, two), the selection unit 361b waits for an opportunity to select a player at least a further one time. The aforementioned predetermined rules refer to selecting a player whose difference in class (grade) with the other players is within a predetermined number, for example, within two classes. It should be noted that designations may also be included as a selection condition, and that it is also possible to remove grades and/or designations from the selection conditions and simply use an order of arrival. It should be noted that in the present example, the selection unit 361b assigns a selection number for example in order of selection to the client terminal devices 1 that have been selected.

In a case where a player is not selected by the selection unit 361b, the standby unit 361c puts that player into a standby state, and causes the selection unit 361b to execute player selection. A standby state is a state of waiting for an opponent to be selected by the selection unit 361b.

The first execution unit 361d causes execution of the game in the same game space among players selected by the selection unit 361b. That is, it transmits to the client terminal devices 1 to be used by the selected players instruction information to an effect that the game is to be executed among players selected by the selection unit 361b as opponents (with the players virtually sitting at a same table).

The second execution unit 361e causes execution of a one-on-one game in a same game space between the player that has been put in a standby state by the standby unit 361c and the CPU player.

At a predetermined time point, the rating mean value calculation unit 361f calculates a mean value of the ratings of all member players corresponding to the player selection process in the mahjong game of three or four players targeted for rating calculations for example. The comparison unit 361g calculates a difference between the calculated rating mean value and the predetermined reference value.

In a case where the difference between the calculated rating mean value and the predetermined reference value, for example, a value of 1,500, is the predetermined value or greater, and in a case where the this-time calculated difference is larger compared to the above-mentioned difference between the calculated rating mean value and the reference value, the adjustment unit 361h determines to execute an adjustment process for bringing the rating mean value closer to the reference value and, based on this determination, performs a settings change in accordance with conditions to be described later on the rating of the CPU player, and calculates opponent player ratings among players that have competed against the CPU player.

In regard to a winner, a new rating is the current rating+μ (1−winning probability/100), and in regard to a loser is the current rating+μ(0−winning probability/100). Note here that μ is a coefficient set for updating the ratings. In the present embodiment, μ=10 is set. It should be noted that in a case where the targeted player is inferior, a value in which the (winning probability/100) is subtracted from 1 is applied for the aforementioned (winning probability/100).

FIG. 17 is a table showing one example of a relationship between rating differences and winning probabilities. In FIG. 17, in a case where one's self current rating is a value of 1,100 and the current rating of the opponent played against is a value of 1,500, that is, when the difference is −400, the winning probability of the superior side (opponent side) is 70%, so that when the inferior side becomes the winner, the new rating becomes 1,100+10×(1−(1−0.7))=1,107, and conversely becomes 1,100+10×(0−(1−0.7))=1,097 in the case of becoming the loser, such that it increases by a value of 7 when the self, which is the inferior side, has won, and decreases by a value of 3 when the self has lost.

On the other hand, in a case where one's self current rating is a value of 1,900 and the current rating of the opponent played against is a value of 1,500, that is, when the difference is +400, the winning probability of the superior side (self side) is 70%, so that when the superior side becomes the winner, the new rating becomes 1,900+10×(1−0.7))=1,903, and conversely becomes 1,900+10×(0−0.7))=1,893 in the case of becoming the loser, such that it increases by a value of 3 when the self, which is the superior side, has won, and decreases by a value of 7 when the self has lost.

In the foregoing, when an adjustment has been determined necessary to lower the mean value in a case where the mean value of the ratings of all players (excluding the CPU player) has exceeded the reference value for various reasons, the rating of the CPU player is set to a value of 1,500 during the competitive game, and corresponding to this, the competitive game is caused to be carried out with capabilities according to settings of parameters described later, and on the other hand, in the calculation of the ratings of players who have competed against the CPU player, the rating of the CPU player is reduced from the value of 1,500 by a predetermined value, for example by a value of 500 (that is, to become a value of 1,000), and the calculations of the new ratings of the players are carried out, thereby making it possible have the mean value of the ratings of all players move in a downward direction.

Conversely, when an adjustment has been determined necessary to raise the mean value in a case where the mean value of the ratings of all players (excluding the CPU player) has fallen below the reference value for various reasons, the rating of the CPU player is set to a value of 1,500 during the competitive game, and corresponding to this, the competitive game is caused to be carried out with capabilities according to settings of the parameters, and on the other hand, in the calculation of the ratings of players who have competed against the CPU player, the rating of the CPU player is increased from the value of 1,500 by a predetermined value, for example by a value of 500 (that is, to become a value of 2,000), and the calculations of the new ratings of the players are carried out, thereby making it possible have the mean value of the ratings of all players move in an upward direction. Due to the increase/decrease adjustments of new ratings in this manner, it becomes possible to maintain the mean value of the ratings of all players at the reference value or substantially at the reference value.

When insertion of a CPU player has been determined by the adjustment unit 361h, the CPU player setting unit 361i causes insertion of the CPU player, whose game advancement is controlled by the control unit 36 (controlled by computer), into the competitive game. The rating of the CPU player is set to the reference value, for example a value of 1,500, and various parameters are set so that the mahjong game is executed with capabilities (real capabilities) corresponding to this value of 1,500. Parameters used in setting the capabilities of the CPU player include a parameter that determines a probability of aiming for difficult to obtain hand or aim for low-point hands, a parameter that determines a probability of discarding a different tile even though there is a better tile to discard, a parameter that determines a probability of not calling "ron" despite having a hand, that is, causing a process of letting a winning hand pass, and other parameters may be employed, and these are set (experientially) so as to achieve a rating of a value of 1,500 in a real capability manner.

The initial rating setting unit 361*j* performs initial setting for ratings of new members under predetermined conditions mentioned earlier (for example, number of games played). In the present embodiment, at a time point when a preset number of games has been completed after a new registration, a corresponding grade is determined by the grade determining unit 161*g* according to the results during that time, and a total value of a preset number of points corresponding to the grade that has been set and a preset number of points corresponding a percentage of wins by which first place was obtained is set as an initial rating.

Hereinafter description is given first regarding processing of a mahjong game, after which description is given regarding one embodiment of a rating adjustment process.

Figure 9:
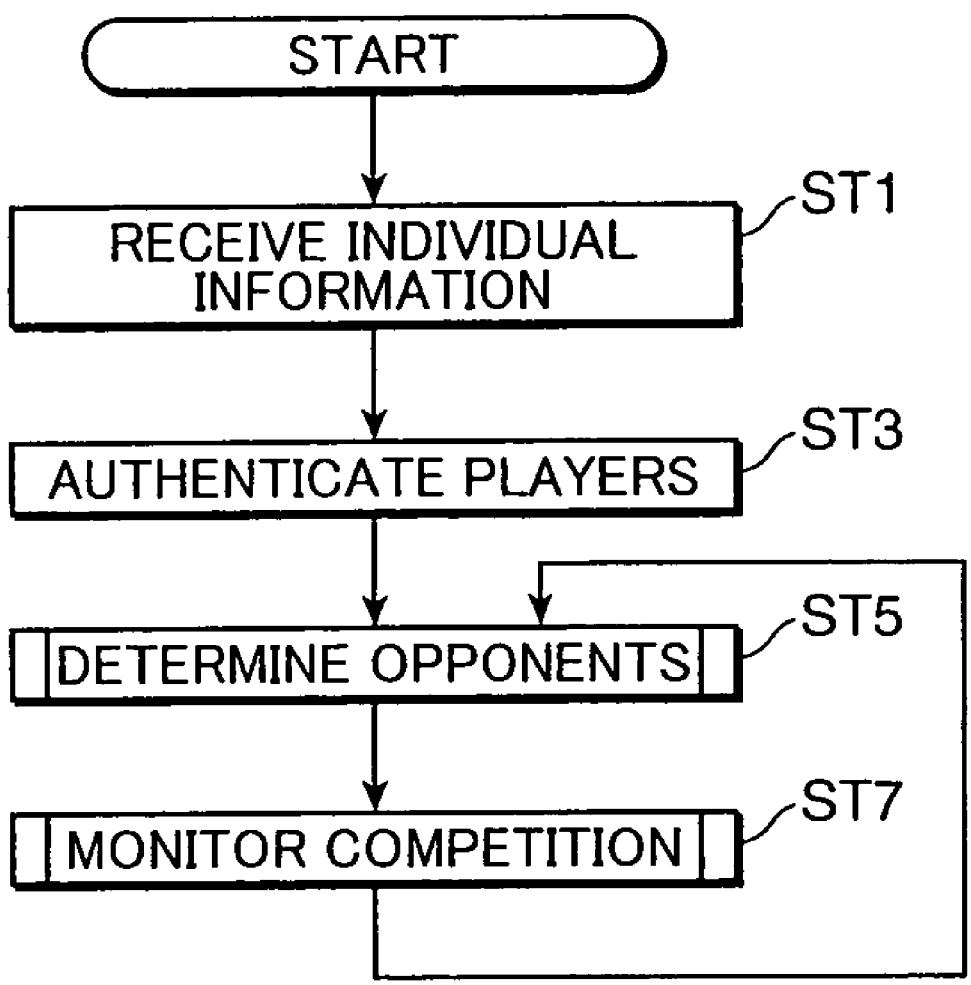
FIG. 9 is one example of a flowchart indicating operations of a center server device.

FIG. 9 is one example of a flowchart indicating operations of the center server device 3. First, individual information transmitted from the client terminal devices 1 is received by the reception unit 361*a* (step ST1), then a player authentication process is executed based on the player information stored in the player information storage unit 362*a*, and participation into the game is permitted once affirmed (step ST3). After this, based on the class stored in the grade storage unit 362*b* and the designation stored in the designation storage unit 363*c*, two or more players to play in the same game space are selected by the selection unit 361*b* from among players whose participation has been received and permitted by the reception unit 361*a* (received where "single player" mode, which is described later, is not the case), and instruction information to the effect that the players selected by the selection unit 361*b* are to execute a game in the same game space according to the first execution unit 361*d* is transmitted to the client terminal devices 1 to be used by the selected players (step ST5). It should be noted that the information processing unit 361 carries out monitoring of the usage status of all the client terminal devices 1 executing the game according to the first execution unit 361*d* (step ST7).

Figure 10:
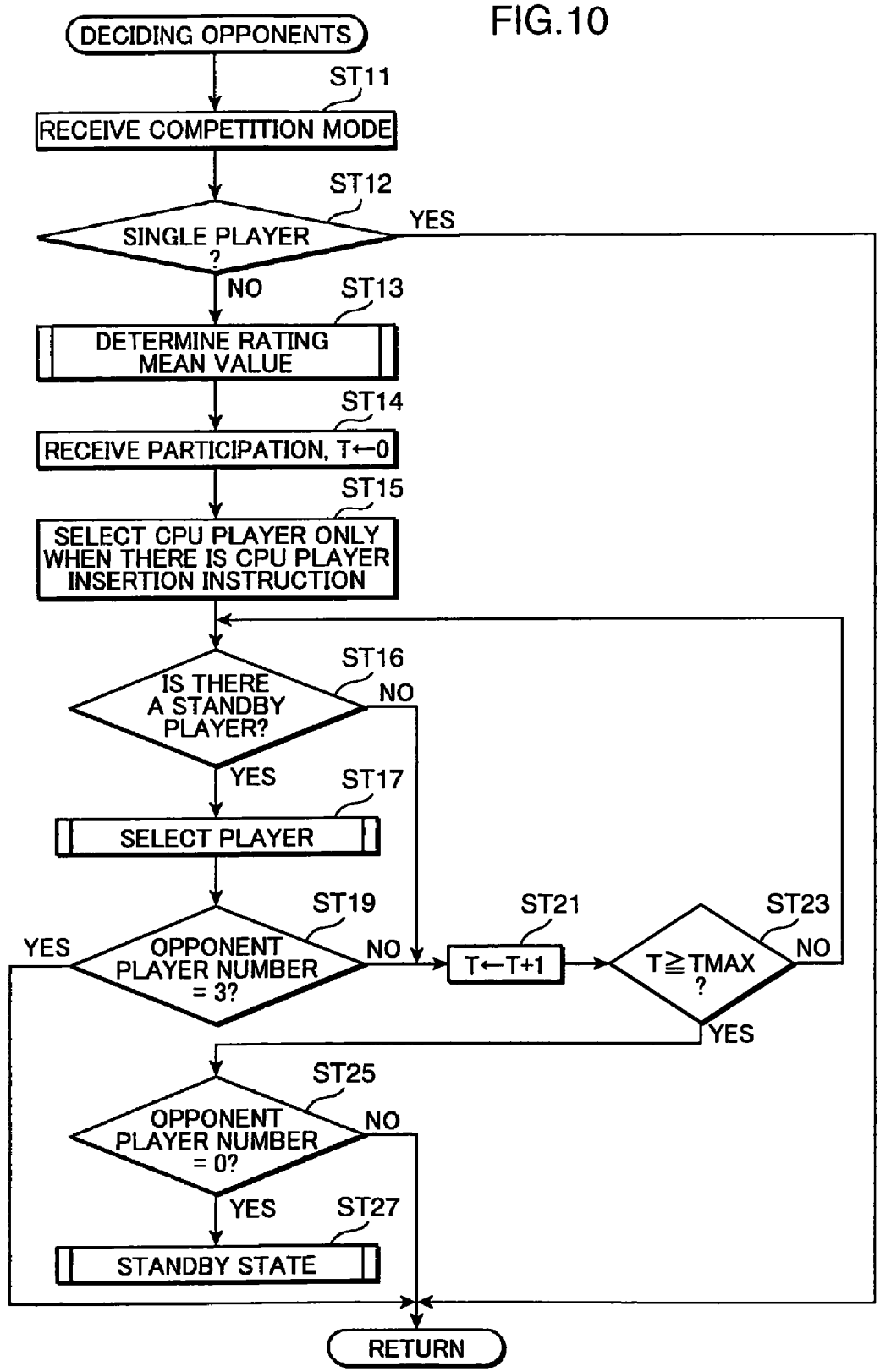
FIG. 10 is one example of a detailed flowchart of step ST5 (process of determining opponents) shown in FIG. 9.

FIG. 10 is one example of a detailed flowchart of step ST5 (process of determining opponents) shown in FIG. 9. It should be noted that unless stated otherwise, the following processing is carried out by the selection unit 361*b*. First, a competition mode sent from the client terminal device 1 is received by the reception unit 361*a* (step ST11). There are three competition modes, "single player," "in-store competition," and "network competition." The "single player" mode is a mode competing against a CPU player, the "in-store competition" mode is a competition mode when all the competitors are using client terminal devices 1 connected to the same store server 2, and the "network competition" is a competition mode when at least one player among the competitors is a player using a client terminal device 1 connected to a different store server.

Following this, a determination is carried out by the reception unit 361*a* as to whether or not the competition mode is the "single player" mode (step ST12). The processing returns when this determination is affirmative. When this determination is negative, a process of determining a rating mean value is executed (step ST13), after which the player is received and a time counter T is initialized to 0 (step ST14). Following this, only in a case where a CPU player insertion instruction has been issued at step ST13, the CPU player is automatically selected (step ST15) and instruction information is transmitted to the client terminal device 1 of the player that is playing so that a waiting screen shown in FIG. 11 is displayed.

Figure 11:
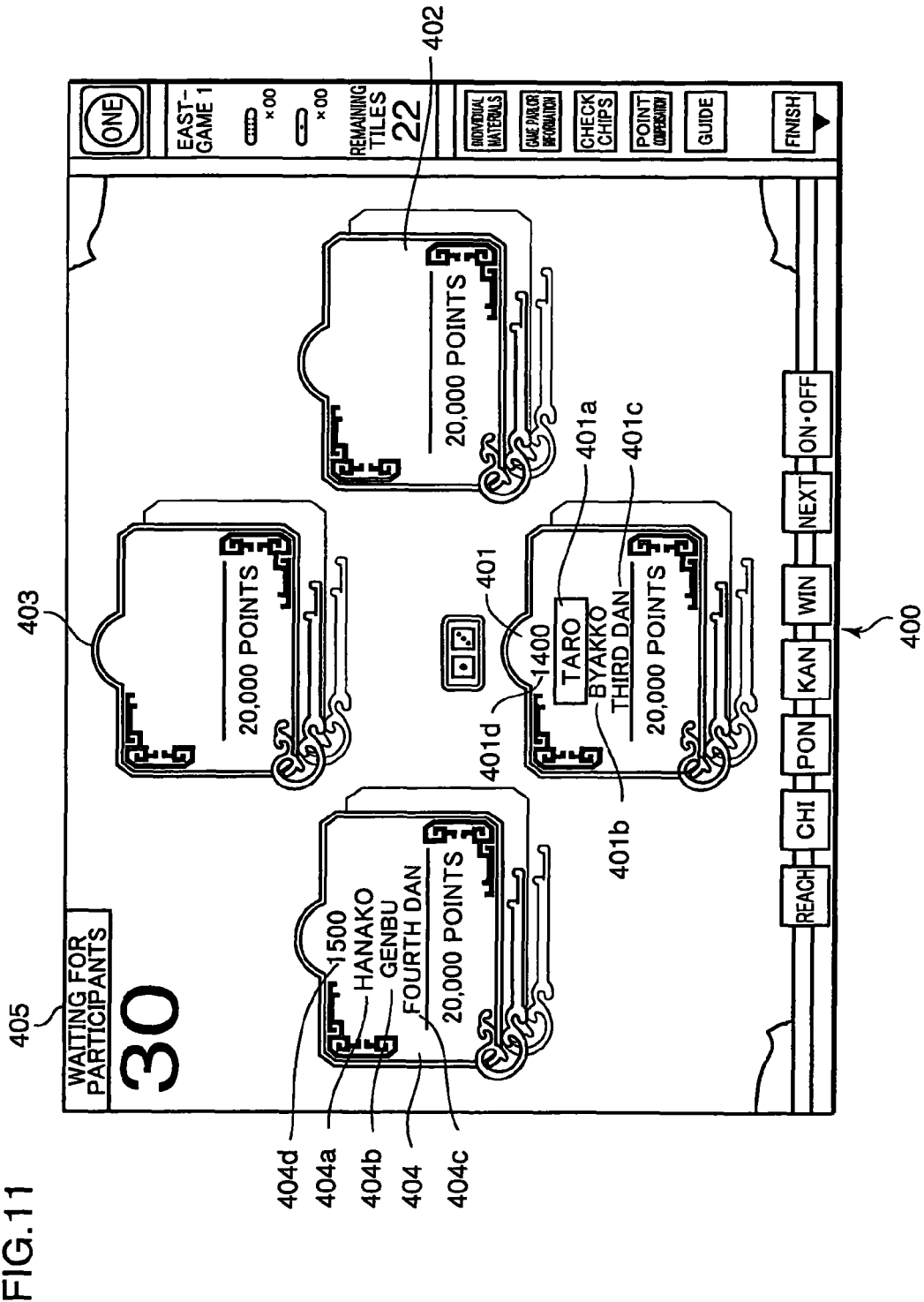
FIG. 11 is one example of a screen diagram of a waiting screen.

FIG. 11 is one example of a screen diagram of a waiting screen. In a waiting screen 400, player information 401 of the player to whom this screen is displayed is displayed on a lower side of the screen, and player information 402 and 403 indicating that opponents are not selected is displayed on an upper side and right side of the screen, and player information 404 of the CPU player for which the CPU player insertion instruction was received at step ST13 is displayed on the left side of the screen. The player information 401 and 404 displays names 401*a* and 404*a*, which are namings of the players in the game, player designations 401*b* and 404*b*, player grades 401*c* and 404*c*, and player ratings 401*d* and 404*d*. For example, the CPU player name is "Hanako," the designation is "Genbu," the grade is "fourth dan," and the rating is a value of 1,500, which has been set in advance. It should be noted that the rating of the CPU player that is displayed may be a value used in calculations. The waiting screen 400 does not display player information 402 and 403 of the opponents other than the player using the client terminal device 1 on which this screen is displayed and the CPU player, and therefore this player can confirm that opponents have not yet been selected.

Description is given returning again to the flowchart shown in FIG. 10. A determination is carried out as to whether or not there is player who has been put into the standby state by the standby unit 361*c* or a player who has been received already (step ST16). The procedure proceeds to step ST21 when this determination is negative. When this determination is affirmative, two or more or three or less players (for a total of four players (including the CPU player)) who are to play in the same game space from among received players and players who have been put into a standby state by the standby unit 361*c* are selected (step ST17) based on the classes stored in the grade storage unit 362*b* and the designations stored in the designation storage unit 363*c*, then instruction information is transmitted to the client terminal device 1 being played by the player so that a waiting screen indicating a result of the selection is displayed.

Figure 12:
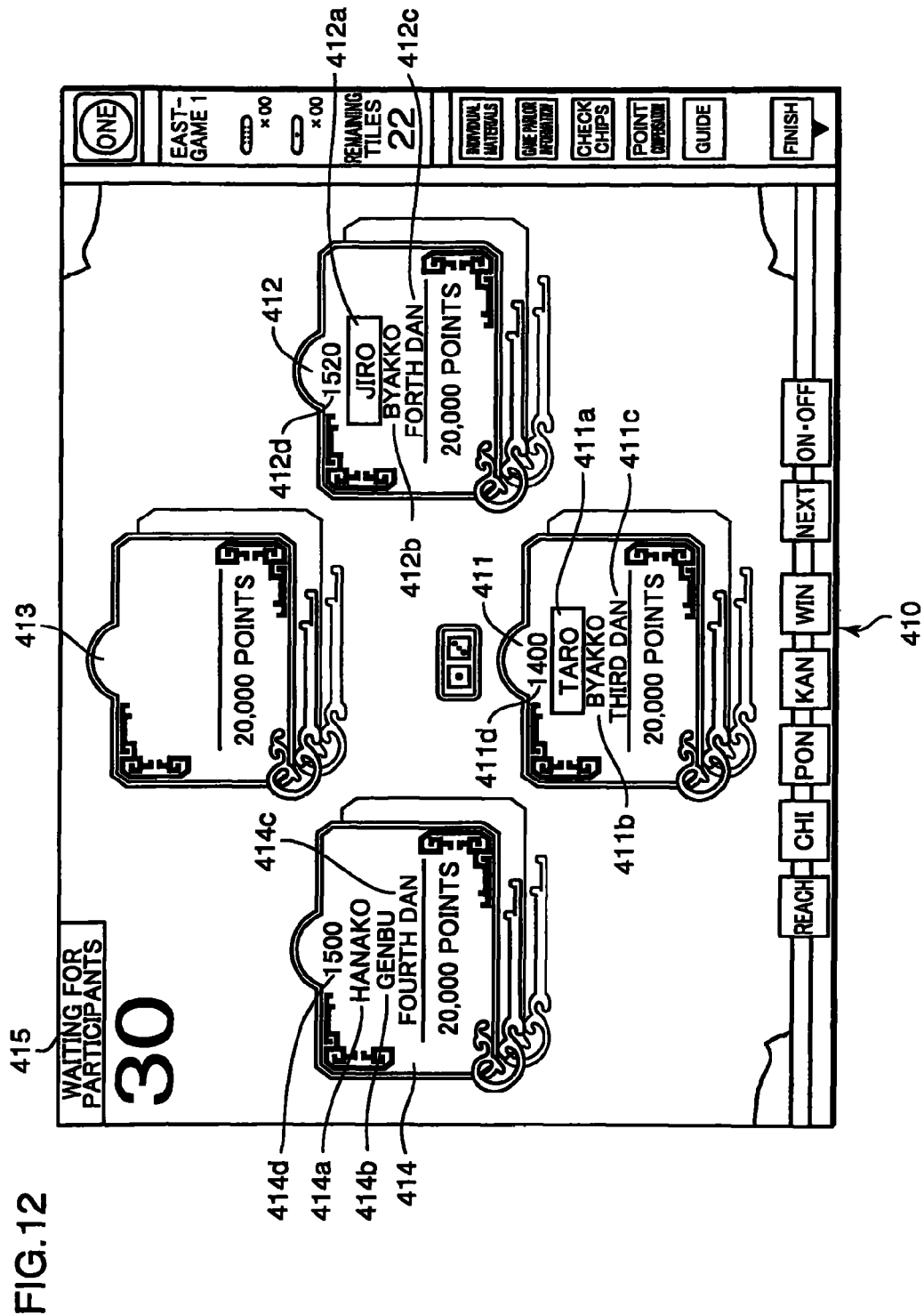
FIG. 12 is one example of a waiting screen indicating a selected result.

FIG. 12 is one example of a waiting screen indicating a selected result. In a waiting screen 410, player information 411 of the player to whom this screen is displayed is displayed on the lower side of the screen, player information 413 indicating that an opponent is not selected is displayed on the upper side of the screen, player information 414 of the CPU player is displayed on the left side of the screen, and player information 412 of the player selected by the selection unit 361*b* is displayed on the right side of the screen. The player information 411, 412, and 414 displays names 411*a*, 412*a*, and 414*a*, which are namings of the players in the game, player designations 411*b*, 412*b*, and 414*b*, player grades 411*c*, 412*c*, and 414*c*, and player ratings 411*d*, 414*d*, and 412*d*. In addition to the player using the client terminal device 1 on which this screen is displayed and the CPU player, the waiting screen 410 displays player information 412 of the player (opponent) selected by the selection unit 361*b*, and therefore the players using the client terminal devices 1 on which this screen is displayed can confirm that one opponent has been selected.

Description is given returning again to the flowchart shown in FIG. 10. A determination is carried out as to whether or not the number of players (number of opponents) selected at step ST17 is three (step ST19). The processing returns when this determination is affirmative. When this determination is negative, the time counter T is incremented (step ST21), and a determination is carried out as to whether or not the time counter T is a predetermined time TMAX (here, 30 seconds) or greater (step ST23). The procedure returns to step ST16 when this determination is negative. When this determination is affirmative, a determination is carried out as to whether or not the number of players chosen at step ST17 is zero (that is, whether none were selected) (step ST25). When this determination is affirmative, the player is put into a standby state by the standby unit 361c (step ST27). The processing returns when this determination is negative.

Figure 13:
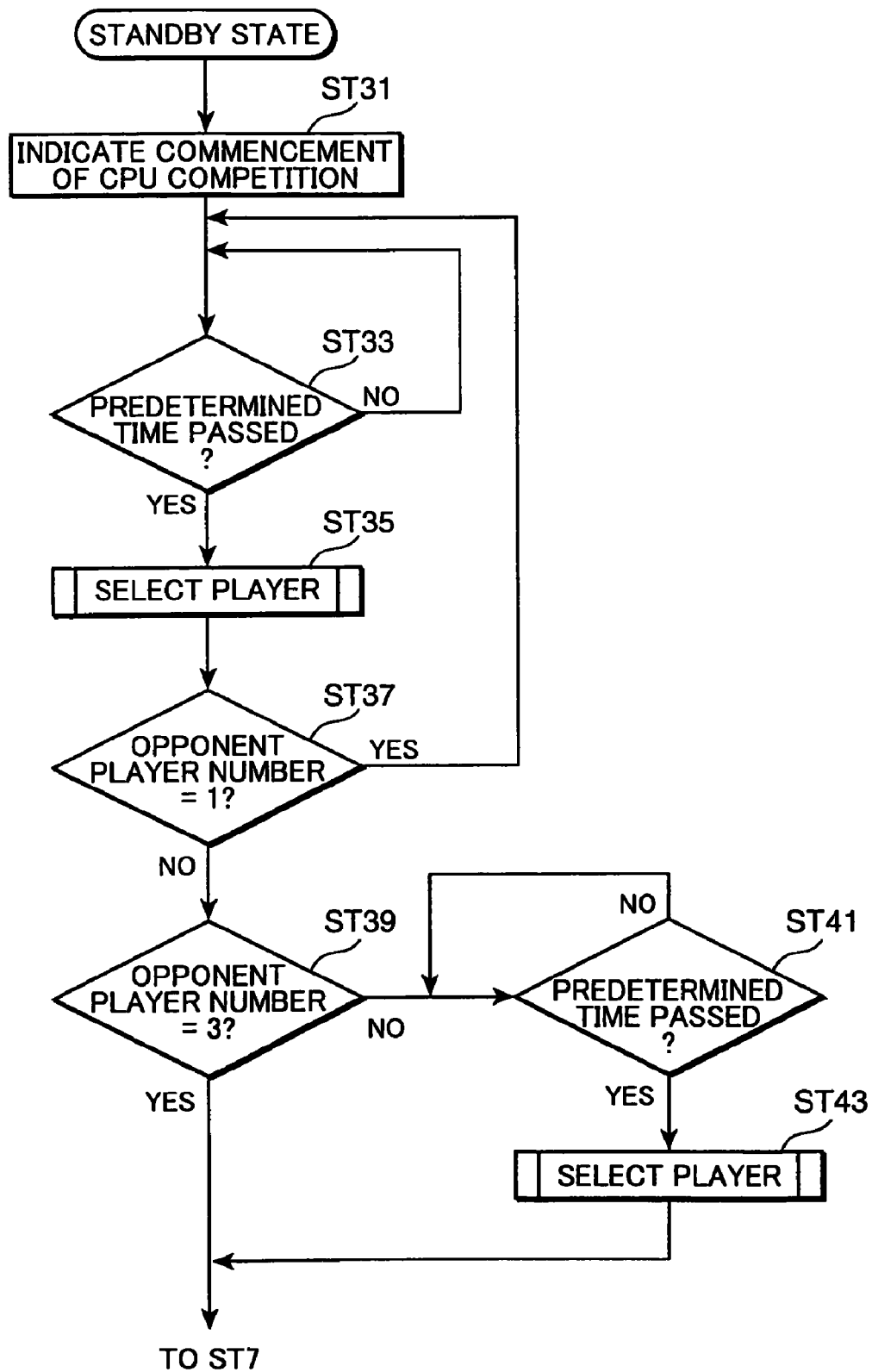
FIG. 13 is one example of a detailed flowchart of processing (standby state processing) of step ST27 shown in FIG. 10.

FIG. 13 is one example of a detailed flowchart of processing (standby state processing) of step ST27 shown in FIG. 10. First, instruction information is transmitted to the client terminal device 1 to commence a CPU competition (a one-on-one competition with only the CPU player) (step ST31).

Following this, a determination is carried out as to whether or not a predetermined time (for example, 30 seconds) has passed (step ST33), and the passing time is counted up until this determination is affirmed. When this determination has been affirmed, player selection is carried out by the selection unit 361b (step ST35), then a determination is carried out as to whether or not the player who has been put into a standby state has been selected (step ST37). When this determination is affirmed, the procedure proceeds to step ST39 in which instruction information is transmitted to the client terminal device 1 so that a screen of appearing opponents is displayed that indicates a player has been selected. The procedure returns to step ST33 when this determination is negative.

When the determination of step ST37 is affirmative, a determination is carried out as to whether or not the number of selected players is three (step ST39). The procedure proceeds to step ST7 of FIG. 11 (process of monitoring competition) when this determination is affirmative. When this determination is negative (when the number of selected players is one), a determination is carried out as to whether or not a predetermined time (for example, 10 seconds) has passed (step ST41), and the passing time is counted up until this determination is affirmed. When this determination has been affirmed, player selection is carried out by the selection unit 361b (step ST43), then the procedure proceeds to step ST7 of FIG. 9 (process of monitoring competition).

Figure 14:
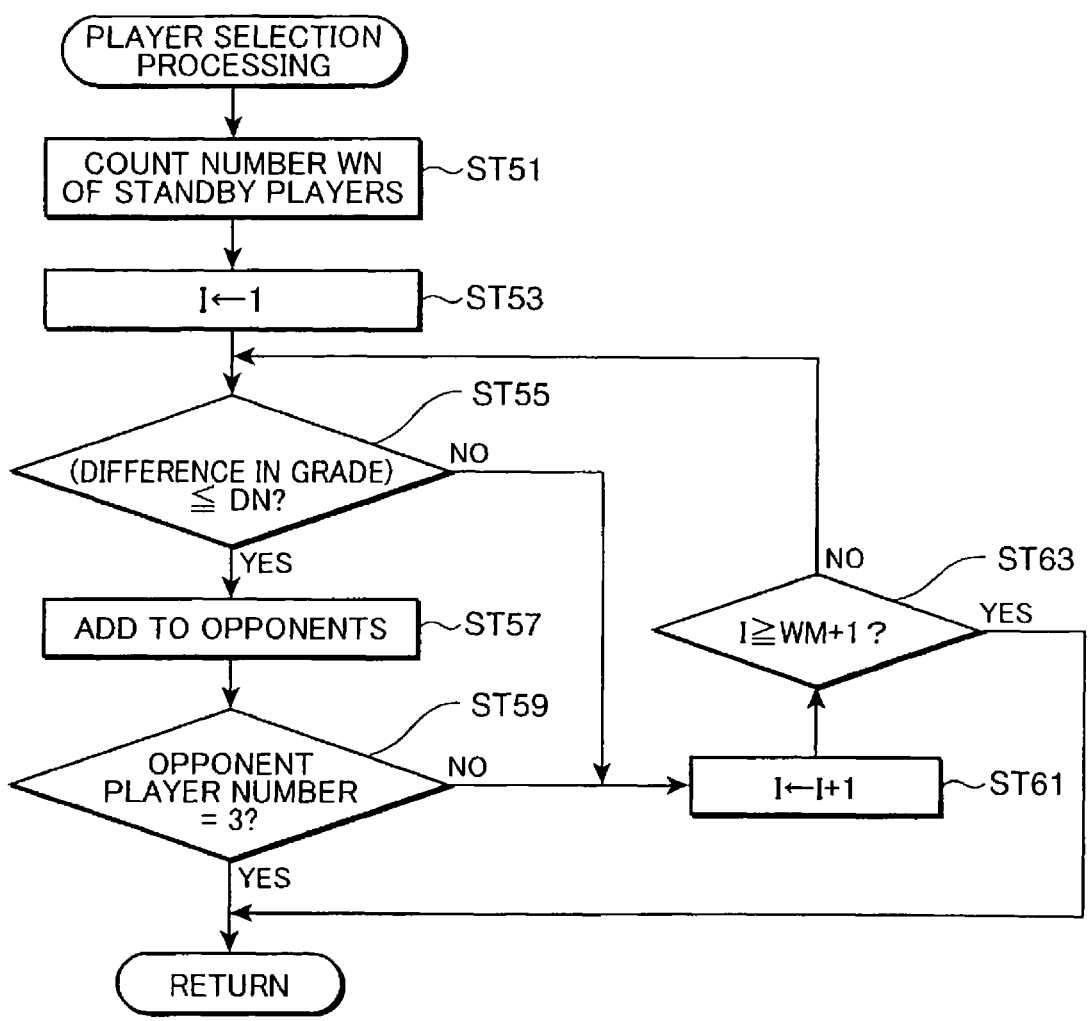
FIG. 14 is one example of a detailed flowchart of processing (player selection processing) of step ST17 shown in FIG. 10.

FIG. 14 is one example of a detailed flowchart of processing (player selection processing) of step ST17 shown in FIG. 10. It should be noted that the processing of step ST17 shown in FIG. 10 is the same processing as step ST35 and step ST43 shown FIG. 13. Furthermore, the following processes are all carried out by the selection unit 361b. First, a total number WN of standby players and received players is counted (step ST51), then a player number counter I is initialized to one (step ST53). Following this, the grades of this player and the I-number player are read in from the grade storage unit 362b, and a determination is performed as to whether or not the difference in grade is a predetermined value DN (here, two) or less (step ST55). The procedure proceeds to step ST61 when this determination is negative. When this determination is affirmative, the I-number player is added to the players to compete with the relevant player (step ST57).

Next, a determination is carried out as to whether or not the number of players to compete with the relevant player is three (step ST59). The processing returns when this determination is affirmative. When this determination is negative, the player number counter I is incremented (step ST61), and a determination is carried out as to whether or not the player number counter I has exceeded the player total number WN (step ST63). Processing returns when this determination is affirmative, and returns to step ST55 when it is negative.

Figure 15:
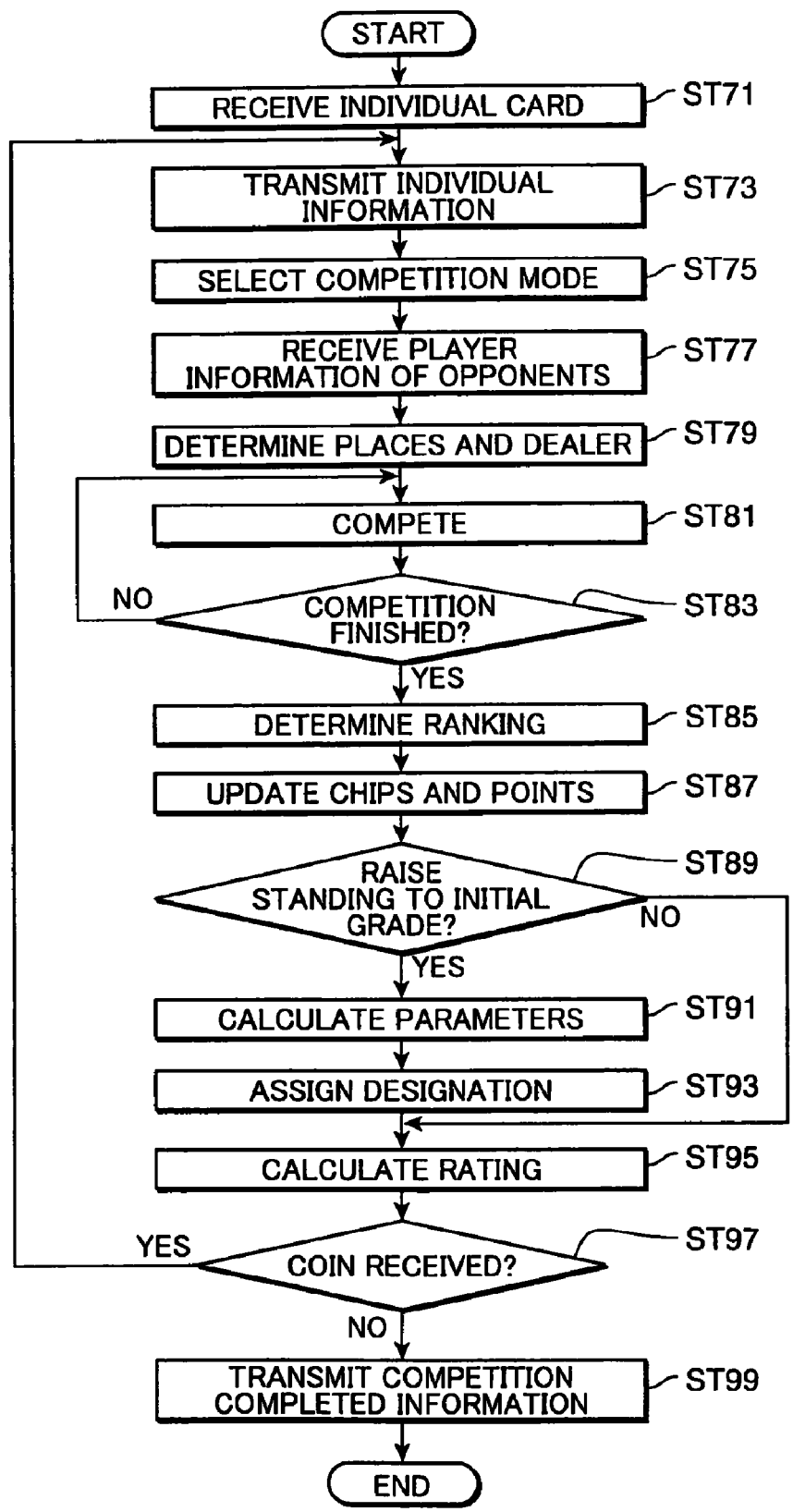
FIG. 15 is one example of a flowchart indicating operations of the client terminal device.

Here, description is given regarding operations of the client terminal device 1, which are executed based on instructions of the above-described center server device 3. FIG. 15 is one example of a flowchart indicating operations of the client terminal device 1. First, user ID data is read in from the individual card inserted into the card reader 13 (step ST71), and the user ID data is transmitted to the center server device 3 (step ST73). Then, a mode selection screen for selecting the competition mode is displayed, input from the player is received and the competition mode is selected (step ST75), and competition mode information is transmitted to the center server device 3.

Opponent information such as name, grade, and designation of other players (opponents) to carry out the game in the same game space is received from the center server device 3 (step ST77). Next, when instruction information to the effect that the game is to be executed is received from the center server device 3, game commencement processing is executed by the game advancement management unit 161a and the places and dealer are determined (step ST79), and further still the competition commences (step ST81) and a competition screen shown in FIG. 16 is displayed.

Figure 16:
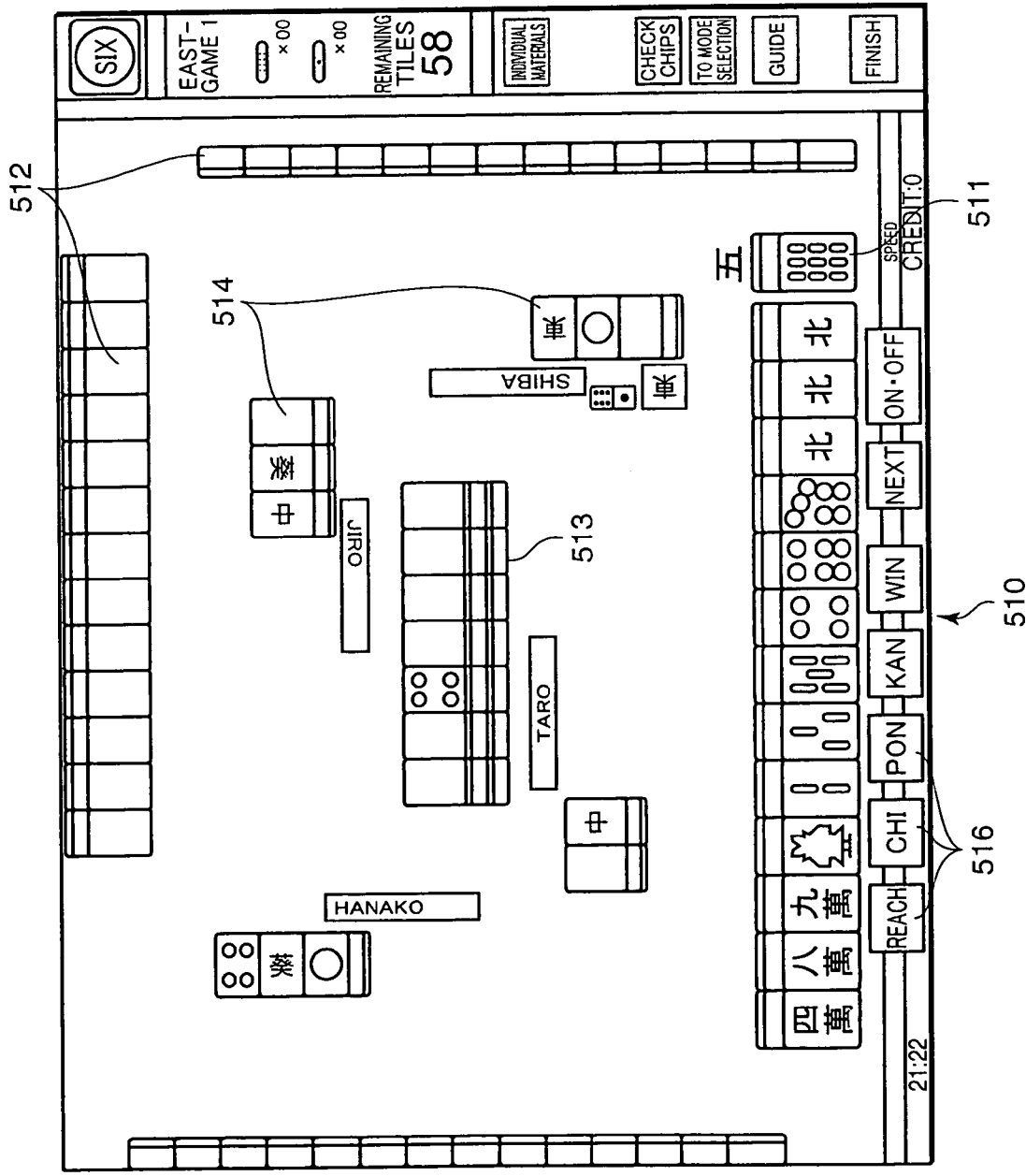
FIG. 16 is one example of a screen diagram of a competition screen indicating a competition status.

FIG. 16 is one example of a screen diagram of a competition screen indicating a competition status. In a competition screen 510, held-tiles 511 of the player are displayed at the lower side of the screen so that the types of tiles are visible, held-tiles 512 of the opponents are displayed at the upper side and left and right sides of the screen so that the types of tiles are not visible, a draw pile 513 including displayed lucky tiles and discarded tiles 514 around the draw pile 513 are displayed substantially in the middle of the screen, and various buttons 516 to be pressed by the player are displayed on the lower side of the screen. The game advances by the player pressing the buttons 516 as required while observing the competition screen 510.

Description is given returning again to the flowchart shown in FIG. 15. After the competition has commenced, a determination is carried out by the game advancement management unit 161a as to whether or not the competition is finished (step ST83). The procedure returns to step ST81 when this determination is negative. When the determination is affirmative, competition completion information indicating that the competition has finished is transmitted to the center server device 3 and the rankings in the game are determined by the result determination unit 161e (step ST85). Then, items virtually held by the players are transferred among the players by the item transferring unit 161f based on the determination result of the result determination unit 161e and the number of games played (step ST87). Following this, based on the number of items and points virtually held by the player, a grade indicating a level of strength of the player in the game is determined by the grade determining unit 161g, and by comparing this with the grade that had been stored in the grade storage unit 162a up until now (at the time of completion of the previous game), a determination is carried out as to whether or not the grade is to be changed to the initial grade (step ST89). In a case where the grade is not to be changed to the initial grade, an item display screen not shown in the diagram that indicates the current number of items and the like is displayed, and the procedure proceeds to step ST95. It should be noted that the grade determined by the grade determining unit 161g is stored in the grade storage unit 162a and also transmitted to the center server device 3 as grade information.

In a case where the grade is to be changed to the initial grade, a designation parameter is calculated by the designation parameter calculation unit 161h indicating a feature of the player in the game (step ST91). Then, based on the designation parameters calculated by the designation parameter calculation unit 161h, a designation of the player in the game is virtually assigned to the player by the designation assigning unit 161i (step ST93), and designation information is then stored in the designation storage unit 162c and also transmitted to the center server device 3.

In a case where the grade is not to be changed to the initial grade (NO at step ST89), and when the processing of step ST93 is executed, a rating calculation is executed (step ST95).

Although not shown in the diagram, after execution of the rating calculation, continuation of the game is guided by an image or by audio for players who clear a predetermined condition, and a determination is carried out as to whether or not the game is to be continued due to reception of this guiding and reception of a determination from the player according to whether or not a coin has been received by the coin receiving unit 14 (step ST97). The procedure returns to step ST73 when this determination is affirmative, and proceeds to step ST99 when the determination is negative.

When the determination of step ST97 is negative, competition information indicating that the game is finished is transmitted to the center server device 3 at step ST99 and processing is completed.

Figure 18:
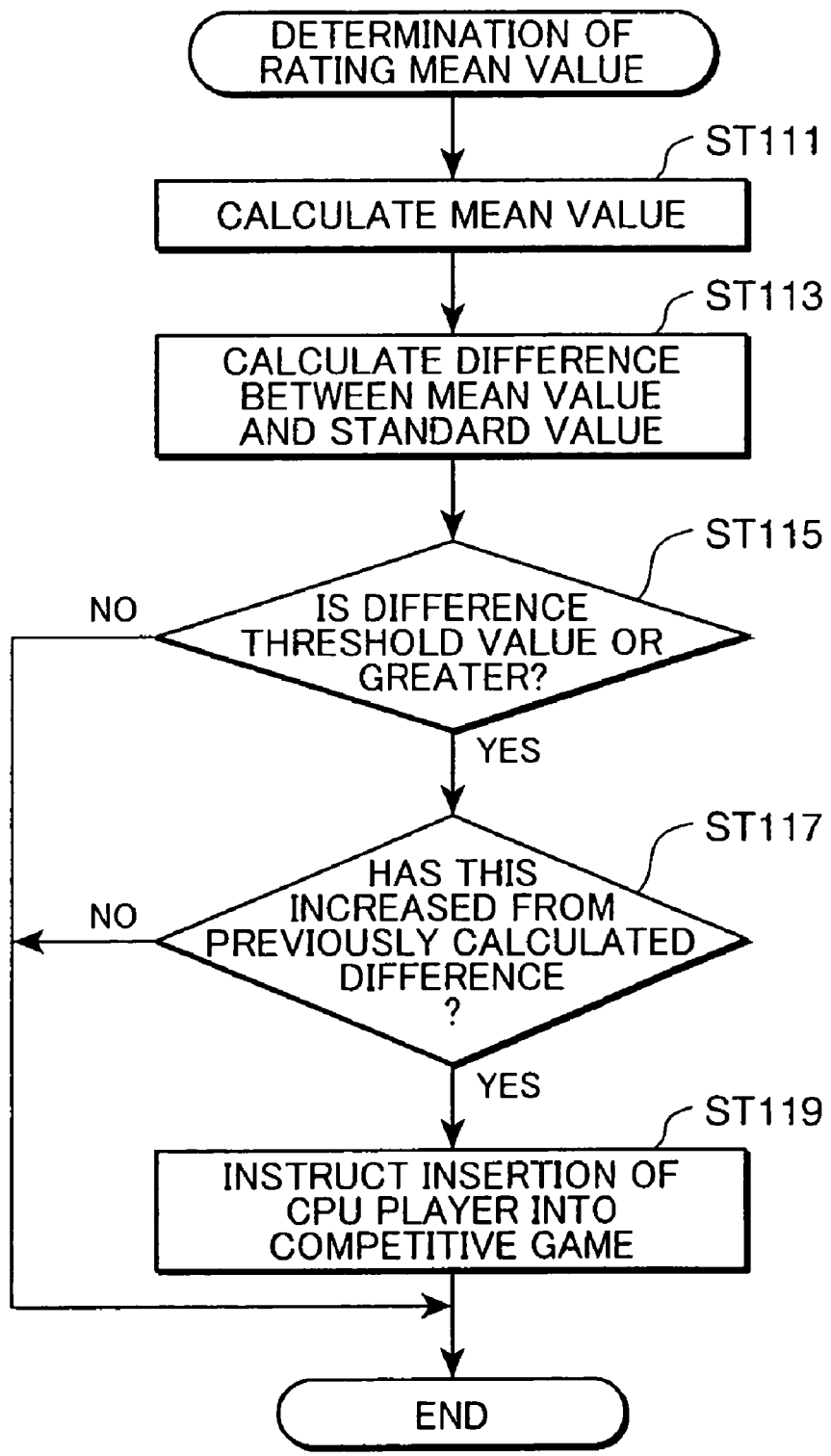
FIG. 18 is a flowchart showing one example of a process of "determining rating mean value" of step ST13 in FIG. 10.

FIG. 18 is a flowchart showing one example of a process of "determining rating mean value" of step ST13 in FIG. 10. First, a calculation is carried out of the mean value of the ratings of all registered players (excluding the CPU player) (step ST111), then the difference between the calculated mean value and the reference value, here a value of 1,500 for example, is calculated (step ST113). A determination is performed as to whether or not the calculated difference is a predetermined threshold value, for example a value of 5 or greater (step ST115), and if it is not the threshold value or greater, adjustment is determined unnecessary and the present flow finishes. On the other hand, if the mean value is the threshold value or greater, a determination is performed (step ST117) as to whether or not there is a tendency of increasing compared to the difference calculated at the time of the previous competitive game (or a difference calculated using a predetermined number of recent times). If the difference has no tendency of increasing, the present flow finishes. On the other hand, if the difference has a tendency of increasing, an instruction is outputted to insert the CPU player into the present competitive game (step ST119) and the present flow finishes.

Figure 19:
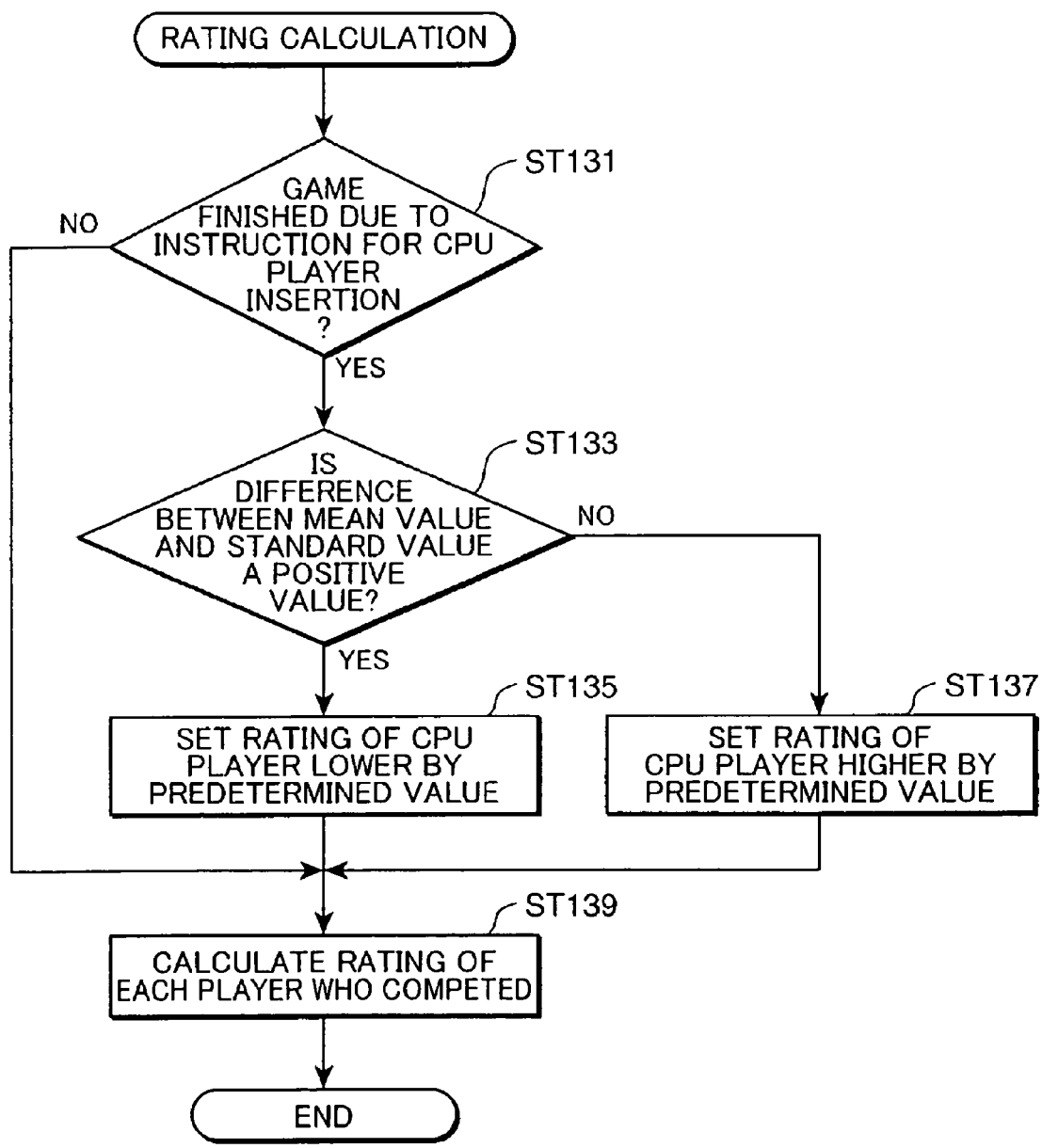
FIG. 19 is a flowchart showing one example of a "rating calculation" process of step ST95 in FIG. 15.

FIG. 19 is a flowchart showing one example of a "rating calculation" process of step ST95 in FIG. 15. First, a determination is performed as to whether or not the competitive game is to be finished due to the instruction of CPU player insertion (step ST131), and when this is negative, new ratings are calculated at step ST139 using the ratings of each player who competed. It should be noted that in a case of a competitive game in which the CPU player is included regardless of the instruction of CPU player insertion, the ratings of players are calculated among ratings of the CPU player that has been set.

On the other hand, in a case where the competitive game is to be finished due to the instruction of CPU player insertion, a determination is performed as to whether or not the difference between the mean value of ratings of all the players and the reference value is a positive value (step ST133), and when the difference is a positive value, a setting is performed to change the rating of the CPU player to a value reduced by a predetermined value amount, for example a value of 1,000 when the original rating of the CPU player is a value of 1,500, in the calculation (only at the calculation stage) (step ST135), then calculations are carried out of the rating of each player among other players using this reduced rating (step ST139). On the other hand, when the difference is a negative value, a setting is performed to change the rating of the CPU player to a value increased by a predetermined value amount, for example a value of 2,000 when the original rating of the CPU player is a value of 1,500, in the calculation (only at the calculation stage) (step ST137), then calculations are carried out of the rating of each player among other players using this increased rating (step ST139).

Here, in order to facilitate understanding, description is given of a calculation example in a case where the rating of the CPU player has been changed.

EXAMPLES

Cases where it is Desired to Raise the Mean Value of Ratings (1) Case where the Rating of the CPU Player is the Same in Real Capabilities and the Displayed Setting In a case where the current self rating is a value of 1,500 and the rating of the CPU player competed against is a value of 1,500, that is, when the difference is 0, the winning probability of both sides is 50% (see FIG. 17).

Difference in standing=1,500−1,500=0

Percentage superior will win=50%

(a) When Opponent has Won

New rating=1,500+(10×(1−0.5))=1,505

(b) When Opponent has Lost

New rating=1,500+(10×(0−0.5))=1,495

(2) Case where Displayed Setting is Greater than Real Capabilities for Rating of the CPU Player In a case where the current self rating is a value of 1,500 and the rating of the CPU player competed against is a value of 1,900 (note however that rating of actual capabilities is a value of 1,500), that is, when the difference is 400, the winning probability of the superior side is 70% (see FIG. 17).

Difference in standing=1,900−1,500=400

Percentage superior will win=70%

(c) When Opponent has Won

New rating=1,500+(10×(1−(1−0.7))=1,507

(d) When Opponent has Lost

New rating=1,500+(10×(0−(1−0.7))=1,497

(3) Comparison

In comparing the foregoing (a) and (c), when the opponent has won, it is (c) whose increase amount increases by 2, and conversely in comparing the foregoing (b) and (d), when the opponent has lost, it is (d) whose decrease amount is reduced by 2. As a result of the rating of the CPU player increasing in the calculations in this manner, the mean value of the ratings overall can be caused to rise.

It should be noted that ratings among the players are also calculated in an equivalent manner. That is, in a case where the CPU player and three players have competed in a mahjong game, a rating is calculated for each of the players respectively in accordance with the above-described rating calculation expression corresponding to the wins and losses against the CPU player, and ratings are also calculated respectively corresponding to wins and losses among the players, then a total amount of fluctuation in these current ratings is added to the current ratings. In a case where the total value of the calculated ratings becomes a negative value, the rating of that player is reduced from the current rating.

Figure 20:
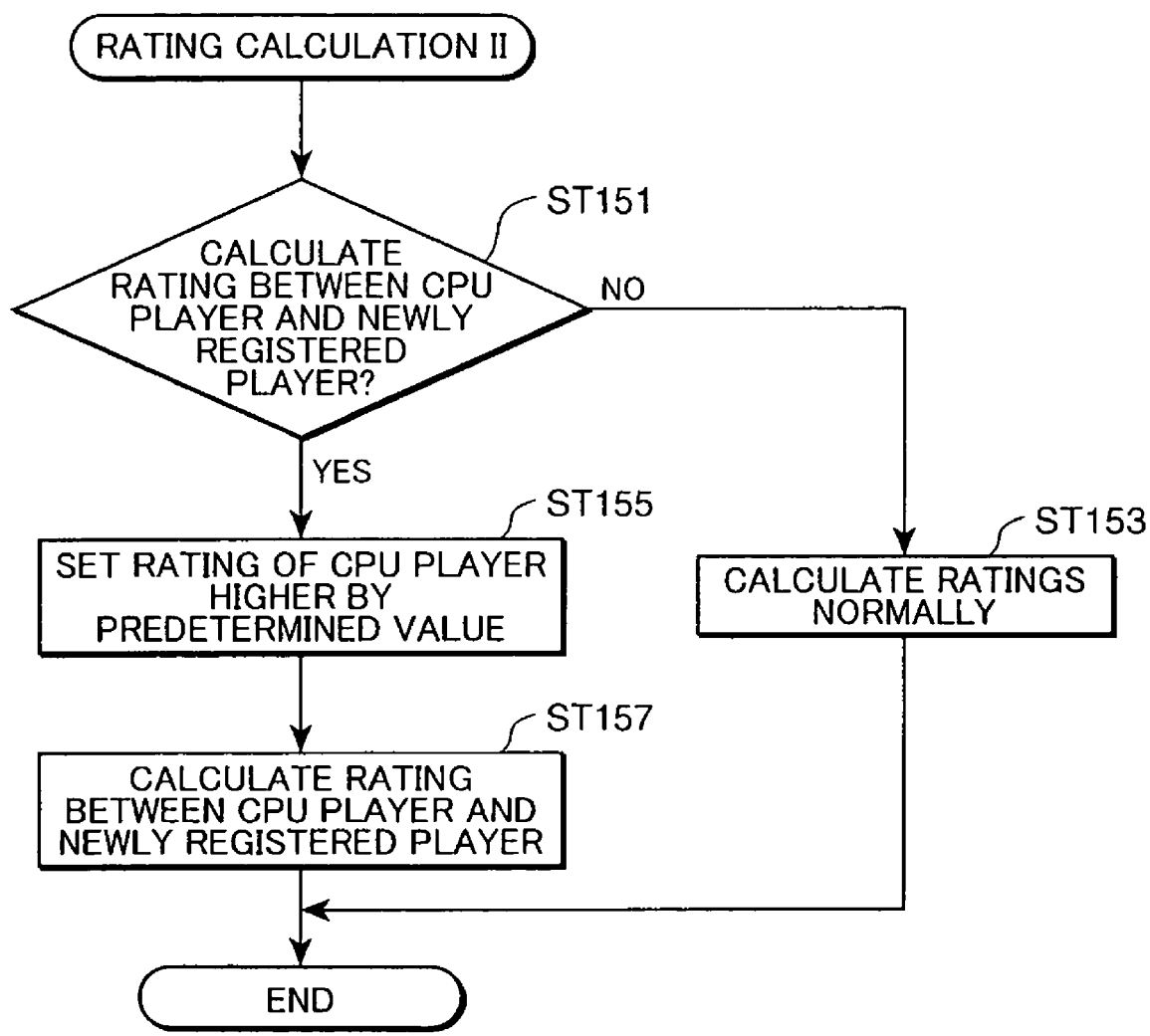
FIG. 20 is a flowchart for describing another embodiment of a rating calculation executed by the adjustment unit.

FIG. 20 is a flowchart for describing another embodiment of a rating calculation executed by the adjustment unit 361*h*.

In the foregoing embodiment, in the event of a competitive game, the difference between the mean value of the ratings of all players and the reference value was obtained to determine whether or not to execute rating adjustments, but since the ratings of newly registered players (as described earlier, any player yet to play a predetermined number of games after new registration) are low in general for reasons such as that they are not sufficiently familiar with the game, there is a tendency for the mean value of ratings to become lower due to this. Accordingly, in a case where the CPU player has competed against members including a newly registered player, a calculation method is employed so that the mean value rises in the rating calculation automatically without needing to monitor the difference between the mean value and the reference value. First, a determination is performed as to whether or not to calculate ratings between the CPU player and the newly registered player (step ST151), and if this is negative, ordinary rating calculations are executed and the present flow finishes. On the other hand, if this is affirmative, the rating of the CPU player is set higher (step ST155) in the calculation by a predetermined value as illustrated in the foregoing step ST137, and a rating between the newly registered player and the CPU player is calculated (step ST157) and the present flow finishes.

Figure 21:
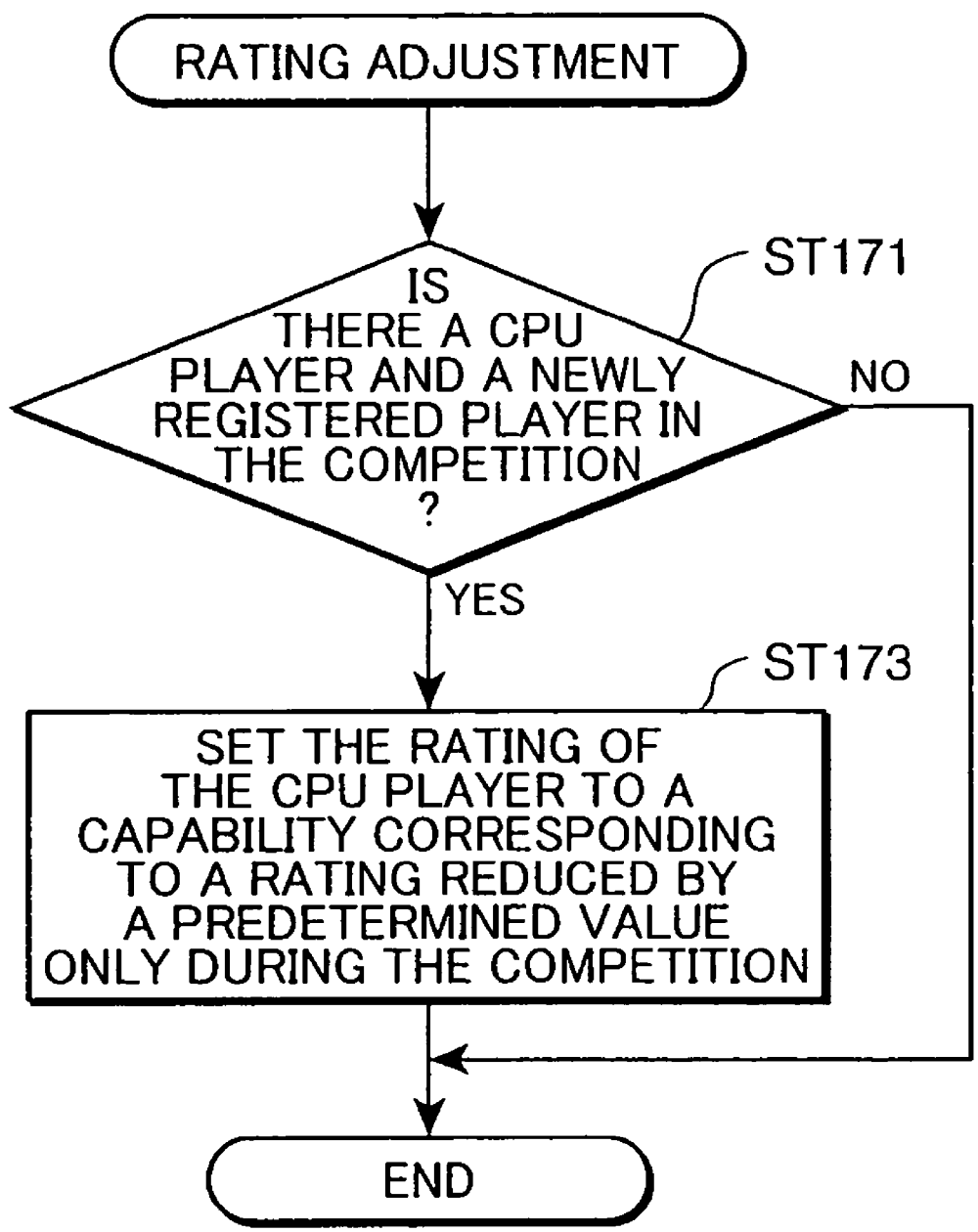
FIG. 21 is a flowchart showing another embodiment of a rating adjustment executed by the adjustment unit.

FIG. 21 is a flowchart showing another embodiment of a rating adjustment executed by the adjustment unit 361$h$. Although this embodiment is equivalent to FIG. 20 in that the relationship between the mean value and the reference value is not monitored, rather than changing the rating of the CPU player in the calculations, the playing capabilities of the CPU player are changed as follows during competitive play, that is, during the game. First, a determination is performed as to whether or not there is a CPU player and a newly registered player in the competition (step ST151), and if this is negative, the present flow finishes. On the other hand, if this is affirmative, the rating of the CPU player is set to a rating reduced by a predetermined value such as in step ST135 for example only during the competition, and a parameter adjustment is executed corresponding to this reduced rating (step ST173). The displayed rating of the CPU player as well as the rating in the calculations remain as they are, but the capability parameters of the CPU player are set lower than the actual capabilities. By executing competitive play using capabilities (real capabilities) corresponding to a rating that has been reduced in this manner by a predetermined value compared to the original rating, it becomes easier for a newly registered player to win and increases in the ratings of newly registered players are encouraged, thereby employing an adjustment method such that the mean value rises.

Furthermore, in the processing shown in FIG. 21, it is also possible to employ an embodiment in a competition with a registered player in which the rating the CPU player is set to a rating reduced by a predetermined value only during the competition, then to carry out the game using parameters whose settings have been adjusted corresponding to this reduced rating. That is, it is also possible that, when the mean value of the ratings of all registered players is determined to be smaller than the reference value, the CPU player, which is controlled by computer and for which a predetermined rating has been set, is set as an opponent of the registered players, and the rating of the CPU player is set to a capability level corresponding to a lower rating than the predetermined rating only during the competition, and on the other hand, when the mean value of the ratings of all registered players is determined to be larger than the reference value, the CPU player is set as an opponent of the registered players and a rating of the CPU player is set to a capability level corresponding to a higher rating than the predetermined rating only during the competition. Due to this processing also, when the mean value of ratings of all registered players is smaller than the reference value (when it is desired to raise the mean value), the CPU player is set to a capability level corresponding to a smaller rating during the competition, and the winning probability of the player becomes higher against the CPU player, and therefore an increase in ratings can be expected and the mean value of the ratings overall becomes higher. On the other hand, when the mean value of ratings of all registered players is higher than the reference value (when it is desired to lower the mean value), the CPU player is set to a capability level corresponding to a higher rating during the competition, and the losing probability of the player becomes higher against the CPU player, and therefore a decrease in ratings can be expected and the mean value of the ratings overall becomes lower.

It should be noted that the present invention can also take the following embodiments.

(A) The present embodiment was described in regard to a case in which the game carried out by the client terminal devices 1 was a mahjong game, but other embodiments are also possible of games carried out by multiple players. For example, other embodiments include card games, go games, shogi games, shooting games, and racing games.

(B) In the present embodiment, steps ST115 and ST117 in FIG. 18 were set as determination conditions for adjusting the rating mean value, but in addition to an embodiment using both conditions, embodiments are possible in which the rating mean value adjustment is carried out using only one of the conditions. Furthermore, the processing of the comparison unit 361$g$ is not limited to player selection in the competitive game, and for example the difference between the mean value and the reference value may be monitored periodically and the result of monitoring may be reflected in the selection of players in the competitive game.

(C) In the present embodiment, the rating of the CPU player was set to a value of 1,500, which is the same as the reference value, but there is no limitation to this. It may be set higher or lower than the reference value, and it may be set with no relationship to the reference value. Furthermore, embodiments are also possible that employ a CPU player having various types of ratings.

(D) The present embodiment was described in regard to a case where the store server device 2 was provided, but an embodiment is possible in which the client terminal devices 1 connect to the center server device 3 via a network.

(E) In the present embodiment, the configuration of connection (network) of the center server device 3, the store server devices 2, and the client terminal devices 1 is not limited to that shown in FIG. 1. For example, various connection embodiments are conceivable as connection embodiments between the client terminal devices 1 and the center server device 3 without using the store server devices 2, including ring configurations, tree configurations, and star configurations. In this case, a tree configuration connection embodiment is preferable. Furthermore, an embodiment is possible in which, by providing the functionality of the center server device 3 to a client terminal device 1, a single client terminal device 1 may connect as a host terminal device to another client terminal device 1. Furthermore, an embodiment is possible in which the functionality of the center server device 3 is provided to a store server device 2 to connect client terminal devices 1 within a store. As shown in FIG. 1, store server devices 2 are provided between the center server device 3 and the client terminal devices 1, and embodiments are preferable in which distributed processing is performed among the center server device 3, the store server devices 2, and the client terminal devices 1. In this case, it is preferable that a store server device 2 is provided in each store, and each client terminal device 1 connects to the store server device.

(F) In the present embodiment, a new (registration) player referred to a person who, after newly registering as a member, had less than a predetermined total of games played of the mahjong game targeted for rating, for example, less than 50 competitions, but there is no limitation to this, and this may be prescribed as a time period or another requirement may be set as a condition.

(G) In the present embodiment, the CPU player was inserted by the CPU player setting unit 361*i* when the rating mean value exceeded or fell below the reference value, but there is no limitation to this, and it is possible to adjust the ratings by changing the rating of the CPU player in the calculation when a condition is satisfied of the rating mean value exceeding or falling below the reference value when the game has been completed for CPU players applied in ordinary games. In this case, the CPU player setting unit 361*i* becomes unnecessary, but a determination may be carried out in regard to the above-described condition prior to step ST95 in FIG. 15.

As described above, a novel game server device, which is communicably connected to multiple game terminal devices which are communicably connected to each other, and through which a competitive game can be executed with each other by receiving operations of players registered as members, is provided with: rating calculation means for calculating a rating to be set for each of registered players by taking both a win-loss result for each competition and a difference of ratings between players who have competed as a probability of winning, and adding an increase/decrease value in accordance with the probability of winning to the rating; rating storage means for storing calculated ratings for each registered player; CPU player setting means for setting, as an opponent against registered players, a CPU player, for which a predetermined rating is set, and which is controlled by a computer; and adjustment means for setting a rating of the CPU player, taking into account a capability of a registered players who are to compete.

Furthermore, a novel game management system is provided with multiple game terminal devices which are communicably connected to each other, and through which a competitive game can be executed with each other by receiving operations of players registered as members, and a game server device that is communicably connected to the game terminal devices, and the game management system is provided with: rating calculation means for calculating a rating to be set for each of registered players by taking both a win-loss result for each competition and a difference of ratings between players who have competed as a probability of winning, and adding an increase/decrease value in accordance with the probability of winning to the rating; rating storage means for storing calculated ratings for each registered player; CPU player setting means for setting, as an opponent against registered players, a CPU player, for which a predetermined rating is set, and which is controlled by a computer; and adjustment means for setting a rating of the CPU player, taking into account a capability of a registered players who are to compete.

Furthermore, a novel rating management method for managing ratings relating to playing capabilities of players registered as members who carry out a competitive game with each other via communication means among multiple game terminal devices communicably connected with a game server device, is a rating management method provided with: a rating calculation step of calculating a rating to be set for registered players by taking both a win-loss result for each competition and a difference of ratings between players who have competed as a probability of winning, and adding an increase/decrease value in accordance with the probability of winning to the rating; a storage step of storing calculated ratings for each registered player, a CPU player setting step of setting a CPU player for which a predetermined rating is set, and which is controlled by a computer, as an opponent against registered players, and an adjustment step of setting a rating of the CPU player, taking into account a capability of registered players who are to compete.

In the game server device and the game management system, it is preferable that a comparison means is further provided for comparing a mean value of ratings of all registered players and a predetermined reference value, and that, in order to bring the mean value closer to the reference value, the adjustment means, when the mean value is determined to be smaller than the reference value by the comparison means, sets the CPU player as an opponent of the registered players and sets a rating of the CPU player higher than a predetermined rating in a calculation of ratings of registered players by the rating calculation means, and when the mean value is determined to be larger than the reference value by the comparison means, sets the CPU player as an opponent of the registered players and sets the rating of the CPU player lower than the predetermined rating in the calculation of ratings of registered players by the rating calculation means.

Furthermore, in the rating management method it is preferable that a comparison step is further provided of comparing a mean value of ratings of all registered players and a predetermined reference value, and that in order to bring the mean value closer to the reference value, in the adjustment step, when the mean value is determined to be smaller than the reference value in the comparison step, the CPU player, which is controlled by computer and for which a predetermined rating has been set, is set as an opponent of the registered players and a rating of the CPU player is set higher than a predetermined rating in a calculation of ratings of registered players in the calculation step, and when the mean value is determined to be larger than the reference value by the comparison means, the CPU player, which is controlled by computer and for which a predetermined rating has been set, is set as an opponent of the registered players and the rating of the CPU player is set lower than the predetermined rating in the calculation of ratings of registered players in the calculation step.

With these configurations, a rating is stored for each registered player, and the mean value of the ratings of all registered players and the predetermined reference value are compared, then processing is carried out in order to bring the mean value closer to the reference value. When it is determined that the mean value is smaller than the reference value, the CPU player, which is controlled by computer and for which a predetermined rating has been set, is set as an opponent of the registered players, and the rating of the CPU player in the calculation of ratings of registered players is set higher than the predetermined rating. On the other hand, when it is determined that the mean value is larger than the reference value, the CPU player, which is controlled by computer and for which the predetermined rating has been set, is set as an opponent of the registered players, and the rating of the CPU player in the calculation of ratings of registered players is set lower than the predetermined rating.

Accordingly, in a case where the mean value is larger than the reference value (when it is desired to lower the mean value), in the rating calculation after the competition after the competitive game has been carried out between the CPU player appearing in the competitive game and the registered players, the rating of the CPU player is set smaller than the predetermined rating (during the competition), and therefore in a case where the registered player wins against the CPU player, the rating thereof increases only a little compared to a case in which the predetermined rating is used as the rating of the CPU player in the calculation. On the other hand, in a case where the registered player loses, the rating thereof is reduced by a larger value compared to a case where the predetermined rating is used as the rating of the CPU player in the calculation, and therefore the mean value of the ratings overall tends toward a decreasing direction.

Conversely, in a case where the mean value is smaller than the reference value (when it is desired to raise the mean value), in the rating calculation after the competition after the competitive game has been carried out between the CPU player appearing in the competitive game and the registered players, the rating of the CPU player is set higher than the predetermined rating (during the competition), and therefore in a case where the registered player wins against the CPU player, the rating thereof increases greatly compared to a case in which the predetermined rating is used as the rating of the CPU player in the calculation. On the other hand, in a case where the registered player loses, the rating thereof is reduced by a smaller value compared to a case where the predetermined rating is used as the rating of the CPU player in the calculation, and therefore the mean value of the ratings overall tends toward an increasing direction. Accordingly, it becomes possible to suppress increasing/decreasing fluctuations of the rating mean value with respect to the reference value.

Furthermore, in the game server device and the game management system, it is preferable that an initial rating setting means is further provided for setting an initial rating after a new registration in accordance with a game capability of that registered player. With these configurations, the initial rating after a new registration is set in accordance with the game capabilities of competitive game playing, and therefore it is possible to set an initial rating of a more accurate level for newly registered members also.

Further still, in the game server device and the game management system, it is preferable that the adjustment means carries out a process for bringing the mean value closer to the reference value when the difference obtained by the comparison means exceeds a predetermined threshold value. With these configurations, processing is carried out in order to bring the mean value closer to the reference value when the difference between the rating mean value and the reference value has exceeded a predetermined threshold value, and therefore when a shift of the mean value from the reference value reaches a level that cannot be ignored, or at a predetermined time point when it is considered desirable to execute adjustment measures in a preventative manner while this shift has not become too large, it is possible to execute adjustment processing for the mean value.

Further still, in the game server device and the game management system, it is preferable that the comparison means monitors transitions in a difference between the mean value and the predetermined reference value, and the adjustment means carries out a process for bringing the mean value closer to the reference value when a this-time obtained difference is greater than a previously-obtained difference by the comparison means. With these configurations, transitions in which the difference becomes large between the mean value and the reference value are monitored, and therefore it is possible to perform adjustment processing on the mean value of ratings at an appropriate timing from a perspective of prevention.

Further still, in the game server device and the game management system, it is preferable that the competitive game is a mahjong game carried out by four registered players seated at virtual seats, and the CPU player setting means sets a CPU player for at least one seat of four seats. With these configurations, in a case of a mahjong game ordinarily played by four people, a CPU player is included in the mahjong game at an ordinary four-person table in a game targeted for rating calculations, and therefore a result can be reflected to the players with a game experience close to ordinary (real) capabilities, and accordingly the accuracy of the ratings is maintained.

In the game server device and the game management system, it is preferable that a comparison means is further provided for comparing a mean value of ratings of all registered players and a predetermined reference value, and that in order to bring the mean value closer to the reference value, the adjustment means, when the mean value is determined to be smaller than the reference value by the comparison means, sets the CPU player as an opponent of the registered players and sets a rating of the CPU player to a capability level corresponding to a lower rating than the predetermined rating only during a competition, and when the mean value is determined to be larger than the reference value by the comparison means, sets the CPU player as an opponent of the registered players and sets a rating of the CPU player to a capability level corresponding to a higher rating than the predetermined rating only during the competition.

In the rating management method it is preferable that a comparison step is further provided of comparing a mean value of ratings of all registered players and a predetermined reference value, and that in order to bring the mean value closer to the reference value, in the adjustment step, when the mean value is determined to be smaller than the reference value in the comparison step, the CPU player, which is controlled by computer and for which a predetermined rating has been set, is set as an opponent of the registered players and a rating of the CPU player is set to a capability level corresponding to a lower rating than the predetermined rating only during a competition, and when the mean value is determined to be larger than the reference value in the comparison step, the CPU player is set as an opponent of the registered players and a rating of the CPU player is set to a capability level corresponding to a higher rating than the predetermined rating only during the competition.

With these configurations, in the adjustment step, when it is determined by the comparison means (step) that the mean value is smaller than the reference value, the CPU player, which is controlled by computer and for which a predetermined rating has been set, is set as an opponent of the registered players, and the rating of the CPU player is set to a capability level corresponding to a lower rating than the predetermined rating only during the competition. On the other hand, when it is determined by the comparison means (step) that the mean value is greater than the reference value, the CPU player is set as an opponent of the registered players, and the rating of the CPU player is set to a capability level corresponding to a higher rating than the predetermined rating only during the competition. Accordingly, when the mean value is smaller than the reference value (when it is desired to raise the mean value), the CPU player is set to a capability level corresponding to a lower rating during the competition, and the winning probability of the player becomes higher against the CPU player, and therefore an increase in ratings can be expected and the mean value of the ratings overall becomes higher. On the other hand, when the mean value is larger than the reference value (when it is desired to lower the mean value), the CPU player is set to a capability level corresponding to a higher rating during the competition, and the probability of losing of the player becomes higher against the CPU player, and therefore a decrease in ratings can be expected and the mean value of the ratings overall becomes lower.

Further still, in the game server device and the game management system, it is preferable that the adjustment means, when the CPU player has competed against a newly registered player, sets a rating of the CPU player higher than the predetermined rating in a calculation of a rating of the newly registered player by the rating calculation means.

Furthermore, in the rating management method it is preferable that in the adjustment step, when the CPU player, which is controlled by computer and for which a predetermined rating has been set, is to compete against a newly registered player, the rating of the CPU player is set higher than the predetermined rating in the calculation of ratings of newly registered players by the rating calculation means.

With these configurations, when the CPU player, which is controlled by computer and for which a predetermined rating has been set, has competed against a newly registered player, the adjustment means sets a rating of the CPU player higher than the predetermined rating in a calculation of a rating of the newly registered player by the rating calculation means. Accordingly, in the rating calculation for newly registered players, who ordinarily have low ratings, the value is set higher during the competition even though the CPU player has its normal rating, and therefore in a case where the newly registered player wins against the CPU player, although the rating rises greatly compared to a case where the calculation is carried out using the predetermined rating as the rating of the CPU player, in a case where the newly registered player loses, the rating is reduced by a smaller value compared to a case where the calculation is carried out using the predetermined rating as the rating of the CPU player, and therefore the mean value of the ratings overall tend toward an increasing direction. Accordingly, it becomes possible to increase the rating mean value.

Further still, in the game server device and the game management system, it is preferable that the adjustment means, when the CPU player is to compete against a newly registered player, sets a rating of the CPU player to a capability level corresponding to a lower rating than the predetermined rating only during the competition.

Furthermore, in the rating management method it is preferable that in the adjustment step, when the CPU player, which is controlled by computer and for which a predetermined rating has been set, is to compete against the newly registered player, a rating of the CPU player is set to a capability level corresponding to a lower rating than the predetermined rating only during the competition.

With these configurations, when the CPU player, which is controlled by computer and for which a predetermined rating has been set, is to compete against a newly registered player, the adjustment means sets a rating of the CPU player to a capability level corresponding to a lower rating than the predetermined rating only during the competition, and therefore the probability of the newly registered player being beaten by the CPU player becomes relatively higher and accordingly it becomes possible to lower the ratings of newly registered players overall.

The invention claimed is:

1. A game server device that is communicably connected to a plurality of game terminal devices which are communicably connected to each other, and through which a competitive game can be executed with each other by receiving operations of players registered as members, comprising:
    means for calculating a rating for each registered player based on at least won-loss results and a rating difference between players who have competed as a probability of winning, said rating calculating means comprising means for adding an increase/decrease value in accordance with a probability of winning;
    means for storing calculated ratings for each registered player;
    means for defining a CPU player to serve as an opponent against registered players;
    adjustment means for setting a rating of the CPU player, taking into account a capability of a registered players who are to compete; and
    comparison means for comparing a mean value of ratings of all registered players and a predetermined reference value;
    wherein when the mean value is determined to be smaller than the reference value by the comparison means, the CPU player rating is set by the adjustment means to be higher than a predetermined rating identified in a calculation of ratings of registered players by the rating calculating means, and when the mean value is determined to be larger than the reference value by the comparison means, the CPU player rating is set by the adjustment means to be lower than the predetermined rating in the calculation of ratings of registered players by the rating calculating means.

2. The game server device according to claim 1 wherein the adjustment means carries out a process for bringing the mean value closer to the reference value when the difference obtained by the comparison means exceeds a predetermined threshold value.

3. The game server device according to claim 1 wherein the comparison means monitors transitions in a difference between the mean value and the predetermined reference value, and the adjustment means carries out a process for bringing the mean value closer to the reference value when a recently-obtained difference is greater than a previously-obtained difference by the comparison means.

4. A game server device that is communicably connected to a plurality of game terminal devices which are communicably connected to each other, and through which a competitive game can be executed with each other by receiving operations of players registered as members, comprising:
    means for calculating a rating for each registered player based on at least won-loss results and a rating difference between players who have competed as a probability of winning, said rating calculating means comprising means for adding an increase/decrease value in accordance with a probability of winning;
    means for storing calculated ratings for each registered player;
    means for defining a CPU player to serve as an opponent against registered players;
    adjustment means for setting a rating of the CPU player, taking into account a capability of a registered players who are to compete; and
    comparison means for comparing a mean value of ratings of all registered players and a predetermined reference value;
    wherein when the mean value is determined to be smaller than the reference value by the comparison means, the CPU player rating is set by the adjustment means to a capability level corresponding to a lower rating than the predetermined rating only during a competition, and when the mean value is determined to be larger than the reference value by the comparison means, the CPU player rating is set by the adjustment means to a capability level corresponding to a higher rating than the predetermined rating only during the competition.

5. A game management system provided with a plurality of game terminal devices which are communicably connected to each other, and through which a competitive game can be executed with each other by receiving operations of players registered as members, and a game server device that is communicably connected to the game terminal devices, the game management system comprising:

means for calculating a rating a rating for each registered player based on at least won-loss results and a rating difference between players who have competed as a probability of winning, said rating calculating means comprising means for adding an increase/decrease value in accordance with a probability of winning;

means for storing calculated ratings for each registered player;

means for defining a CPU player to serve as an opponent against registered players;

adjustment means for setting a rating of the CPU player, taking into account a capability of a registered players who are to compete; and comparison means for comparing a mean value of ratings of all registered players and a predetermined reference value;

wherein the adjustment means, when the mean value is determined to be smaller than the reference value by the comparison means, sets the CPU player as an opponent of the registered players and sets a rating of the CPU player higher than a predetermined rating in a calculation of ratings of registered players by the rating calculation means, and when the mean value is determined to be larger than the reference value by the comparison means, sets the CPU player as an opponent of the registered players and sets the rating of the CPU player lower than the predetermined rating in the calculation of ratings of registered players by the rating calculation means.

6. The game management system according to claim 5, comprising initial rating setting means for setting an initial rating, after a new registration, in accordance with a game capability of that registered player.

7. The game management system according to claim 5, wherein the adjustment means carries out a process for bringing the mean value closer to the reference value when the difference obtained by the comparison means exceeds a predetermined threshold value.

8. The game management system according to claim 5, wherein the comparison means monitors transitions in a difference between the mean value and the predetermined reference value, and the adjustment means carries out a process for bringing the mean value closer to the reference value when a recently-obtained difference is greater than a previously-obtained difference by the comparison means.

9. A game management system provided with a plurality of game terminal devices which are communicably connected to each other, and through which a competitive game can be executed with each other by receiving operations of players registered as members, and a game server device that is communicably connected to the game terminal devices, the game management system comprising:

means for calculating a rating a rating for each registered player based on at least won-loss results and a rating difference between players who have competed as a probability of winning, said rating calculating means comprising means for adding an increase/decrease value in accordance with a probability of winning;

means for storing calculated ratings for each registered player;

means for defining a CPU player to serve as an opponent against registered players;

adjustment means for setting a rating of the CPU player, taking into account a capability of a registered players who are to compete; and wherein the adjustment means, when the mean value is determined to be smaller than the reference value by the comparison means, sets the CPU player as an opponent of the registered players and sets a rating of the CPU player to a capability level corresponding to a lower rating than the predetermined rating only during a competition, and when the mean value is determined to be larger than the reference value by the comparison means, sets the CPU player as an opponent of the registered players and sets a rating of the CPU player to a capability level corresponding to a higher rating than the predetermined rating only during the competition.

10. A rating management method for managing ratings relating to playing capabilities of players registered as members who carry out a competitive game with each other via communication means among a plurality of game terminal devices communicably connected with a game server device, the rating management method comprising:

a rating calculation step of calculating a rating to be set for registered players by taking both a win-loss result for each competition and a difference of ratings between players who have competed as a probability of winning, and adding an increase/decrease value in accordance with the probability of winning to the rating;

a storage step of storing calculated ratings for each registered player, a CPU player setting step of setting a CPU player for which a predetermined rating is set, and which is controlled by a computer, as an opponent against registered players, an adjustment step of setting a rating of the CPU player, taking into account a capability of registered players who are to compete; and a comparison step of comparing a mean value of ratings of all registered players and a predetermined reference value;

wherein in the adjustment step, when the mean value is determined to be smaller than the reference value in the comparison step, the CPU player is set as an opponent of the registered players and a rating of the CPU player is set higher than a predetermined rating in a calculation of ratings of registered players in the calculation step, and when the mean value is determined to be larger than the reference value in the comparison step, the CPU player is set as an opponent of the registered players and the rating of the CPU player is set lower than the predetermined rating in the calculation of ratings of registered players in the calculation step.

11. A rating management method for managing ratings relating to playing capabilities of players registered as members who carry out a competitive game with each other via communication means among a plurality of game terminal devices communicably connected with a game server device, the rating management method comprising:

a rating calculation step of calculating a rating to be set for registered players by taking both a win-loss result for each competition and a difference of ratings between players who have competed as a probability of winning, and adding an increase/decrease value in accordance with the probability of winning to the rating;

a storage step of storing calculated ratings for each registered player, a CPU player setting step of setting a CPU player for which a predetermined rating is set, and which is controlled by a computer, as an opponent against registered players, an adjustment step of setting a rating of the CPU player, taking into account a capability of registered players who are to compete; and a comparison step of comparing a mean value of ratings of all registered players and a predetermined reference value;

wherein in the adjustment step, when the mean value is determined to be smaller than the reference value in the comparison step, the CPU player is as an opponent of the registered players and a rating of the CPU player is set to a capability level corresponding to a lower rating than the predetermined rating only during a competition, and when the mean value is determined to be larger than the reference value in the comparison step, the CPU player is set as an opponent of the registered players and a rating of the CPU player is set to a capability level corresponding to a higher rating than the predetermined rating only during the competition.

* * * * *